United States Patent
Iwase et al.

(10) Patent No.: US 8,357,073 B2
(45) Date of Patent: Jan. 22, 2013

(54) CONTROL APPARATUS FOR HYBRID VEHICLE POWER TRANSMITTING SYSTEM

(75) Inventors: Yuji Iwase, Mishima (JP); Tatsuya Imamura, Okazaki (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 978 days.

(21) Appl. No.: 12/219,759

(22) Filed: Jul. 28, 2008

(65) Prior Publication Data

US 2009/0036263 A1 Feb. 5, 2009

(30) Foreign Application Priority Data

Jul. 31, 2007 (JP) ................................. 2007-199235

(51) Int. Cl.
*B60K 1/02* (2006.01)
*F16H 59/00* (2006.01)
*F16H 3/72* (2006.01)
*F16H 48/30* (2012.01)
*F16H 48/06* (2006.01)
*B60W 10/04* (2006.01)

(52) U.S. Cl. .................. 477/3; 477/98; 477/107; 475/5; 475/150; 475/153

(58) Field of Classification Search ................ 477/3, 98, 477/107; 475/5, 149, 150, 153; 903/945
See application file for complete search history.

(56) References Cited

U.S. PATENT DOCUMENTS

| | | | | |
|---|---|---|---|---|
| 6,081,042 A * | 6/2000 | Tabata et al. | ..................... | 290/45 |
| 6,093,974 A * | 7/2000 | Tabata et al. | ................ | 290/40 R |
| 6,157,885 A * | 12/2000 | Sakaguchi et al. | .............. | 701/54 |
| 6,729,987 B2 * | 5/2004 | Sakamoto et al. | ............ | 475/117 |
| 6,751,960 B2 * | 6/2004 | Arimitsu et al. | ................ | 60/706 |
| 7,585,249 B2 * | 9/2009 | Sah | ................................... | 477/3 |

(Continued)

FOREIGN PATENT DOCUMENTS

| JP | 2002-161966 | 6/2002 |
|---|---|---|
| JP | 2002-176794 | 6/2002 |

(Continued)

OTHER PUBLICATIONS

Japanese Office Action issued Feb. 14, 2012 in Japanese Patent Application No. 2007-199235 (with English Translation).

*Primary Examiner* — David D Le
*Assistant Examiner* — James M Dolak
(74) *Attorney, Agent, or Firm* — Oliff & Berridge, PLC

(57) ABSTRACT

A control apparatus for a power transmitting system of a hybrid vehicle including (a) a differential portion which has a differential mechanism operatively connected to an engine and a first electric operatively connected to the differential mechanism, and a differential state of which is controlled by controlling an operating state of the first electric motor, and (b) a differential-state switching device which is incorporated in the differential mechanism and which is operable according to a differential-state switching condition, to switch the differential mechanism between a differential state in which the differential mechanism is operable to perform a differential function and a non-differential state in which the differential mechanism is not operable to perform the differential function, the control apparatus including a differential-state-switching-condition changing portion operable to change a differential-state switching condition for switching the differential-state switching device to switch the differential mechanism between the differential and non-differential states, when a temperature of the power transmitting system is lower than a predetermined threshold value.

9 Claims, 14 Drawing Sheets

U.S. PATENT DOCUMENTS

| | | | |
|---|---|---|---|
| 7,766,789 B2 * | 8/2010 | Iwase et al. | 477/3 |
| 7,967,722 B2 * | 6/2011 | Tabata et al. | 477/15 |
| 8,036,798 B2 * | 10/2011 | Tabata et al. | 701/51 |
| 8,088,034 B2 * | 1/2012 | Imamura et al. | 477/3 |
| 8,118,703 B2 * | 2/2012 | Puiu | 477/3 |
| 2005/0029023 A1 * | 2/2005 | Takami et al. | 180/65.3 |
| 2005/0043139 A1 * | 2/2005 | Kennedy | 477/98 |
| 2005/0209760 A1 * | 9/2005 | Tabata et al. | 701/53 |
| 2005/0279546 A1 * | 12/2005 | Tabata et al. | 180/65.2 |
| 2009/0029819 A1 | 1/2009 | Tabata et al. | |
| 2009/0076694 A1 | 3/2009 | Tabata et al. | |

FOREIGN PATENT DOCUMENTS

| | | |
|---|---|---|
| JP | 2006-046576 | 2/2006 |
| JP | A-2006-46386 | 2/2006 |
| JP | 2006-347269 | 12/2006 |
| JP | 2007-08179 | 1/2007 |

* cited by examiner

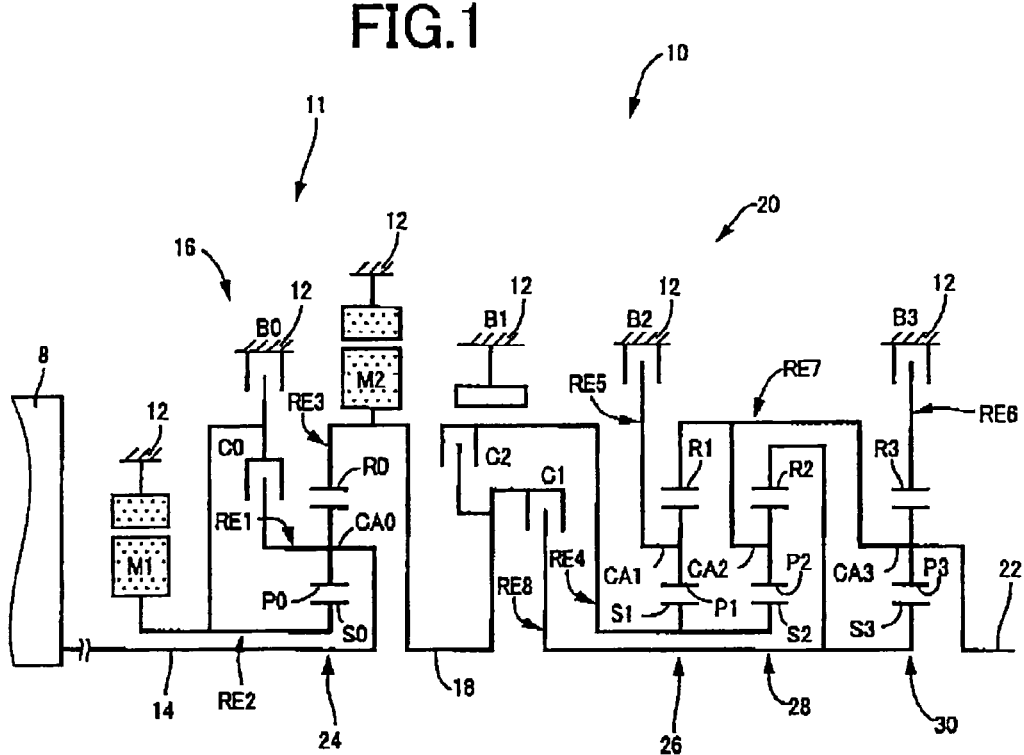

| | C1 | C2 | B1 | B2 | B3 | SPEED RATIO | STEPPING RATIO |
|---|---|---|---|---|---|---|---|
| 1st | O | | | | O | 3.357 | 1.54 |
| 2nd | O | | | O | | 2.180 | 1.53 |
| 3rd | O | | O | | | 1.424 | 1.42 |
| 4th | O | O | | | | 1.000 | SPREAD 3.36 |
| R | | O | | | O | 3.209 | |
| N | | | | | | | |

O ENGAGED

CONTROL APPARATUS FOR HYBRID VEHICLE POWER TRANSMITTING SYSTEM

The present application claim priority from Japanese Patent Application No. 2007-199235 filed on Jul. 31, 2007, the disclosure of which is herein incorporated by reference in its entirety.

BACKGROUND OF THE INVENTION

1. Field of the Invention

The present invention relates in general to a control apparatus for a hybrid vehicle power transmitting system, and more particularly to techniques for promoting a warm-up operation of a hybrid vehicle power transmitting system including a differential mechanism operable to perform a differential function and all electric motor.

2. Discussion of Prior Art

There is known a hybrid vehicle power transmitting system including (a) a differential mechanism operable to distribute an output of an engine to a first electric motor and a power transmitting path between the differential mechanism and drive wheels, (b) a differential limiting device operable to limit or inhibit a differential function of the differential mechanism, and (c) a second electric motor connected to the power transmitting path. FIG. 1 of JP-2006-46386A shows an example of such a hybrid vehicle power transmitting system. A control apparatus for the hybrid vehicle power transmitting system disclosed in this publication is configured to operate the engine at a predetermined warm-up speed and place the differential mechanism in a differential state (in which the differential mechanism is operable to perform the differential function), when the control apparatus determines that it is necessary to warm up the engine or its exhaust system, for example, a catalyst device in the exhaust system.

According to the warm-up operation of the hybrid vehicle power transmitting system performed under the control of the control apparatus disclosed in the above-identified publication, the operating speed of the engine is not bound or influenced by a during speed of the hybrid vehicle, owing to the differential function of the differential mechanism, so that the warm-up operation of the engine and its exhaust system can be effectively promoted. However, not only the engine and its exhaust system but also other components of the power transmitting system such as the differential mechanism are desirably subjected to a warm-up operation. For instance, it is desirable to warm up the differential mechanism, for raising the temperature of a lubricant for the differential mechanism so that the lubricant has a suitable degree of viscosity. The promotion of the warm-up operation of the hybrid vehicle power transmitting system as a whole permits an improvement of fuel economy of the hybrid vehicle. However, the control apparatus disclosed in the above-identified publication does not necessarily assure sufficient promotion of the warm-up operation of the various mechanisms and devices such as the electric motors of the hybrid vehicle power transmitting system.

SUMMARY OF TEE INVENTION

The present invention was made in view of the background art described above. It is therefore an object of this invention to provide a control apparatus for a hybrid vehicle power transmitting system including a differential mechanism operable to perform a differential function and an electric motor, which control apparatus assures effective promotion of warm-up operation of the power transmitting system.

The object indicated above can be achieved according to any one of the following modes of this invention, each of which is numbered like appended claims and depends from the other node or modes, where appropriate, for easier understanding of technical features disclosed in the present application, and possible combinations of those technical features.

(1) A control apparatus for a power transmitting system of a hybrid vehicle including (a) a differential portion which has a differential mechanism operatively connected to an engine and a first electric operatively connected to the differential mechanism, and a differential state of which is controlled by controlling an operating state of the first electric motor, and (b) a differential-state switching device which is incorporated in the differential mechanism and which is operable according to a differential-state switching condition, to switch the differential mechanism between a differential state in which the differential mechanism is operable to perform a differential function and a non-differential state in which the differential mechanism is not operable to perform the differential function, the control apparatus comprising:

a differential-state-switching condition changing portion operable to change the differential-state switching condition when a temperature of the power transmitting system is lower than a predetermined threshold value.

The control apparatus constructed according to the above-described mode (1) of the present invention is configured such that the differential-state switching condition used by the differential-state switching device is changed when the temperature of the power transmitting system is lower than the predetermined threshold value, so that a rise of the temperature of the power transmitting system can be expedited by operations of the differential mechanism and the first electric motor.

(2) The control apparatus according to the above-described mode (1), wherein the predetermined threshold value of the temperature of the power transmitting system is a value above which it is not necessary to change the differential-state switching condition for improving fuel economy of the hybrid vehicle.

(3) The control apparatus according to the above-described mode (1) or (2), wherein the differential-state-switching-condition changing portion changes the differential-state switching condition to expedite a rise of at least one of the temperature of the power transmitting system and a temperature of the first electric motor, when the temperature of the power transmitting system is lower than the predetermined threshold value.

In the above-described mode (3) of the invention, the differential-state switching condition is changed to expedite the rise of the temperature of the power transmitting system and/or the temperature of the first electric motor, when the temperature of the power transmitting system is lower than the threshold value, the warm-up operation of the power transmitting system can be expedited or promoted by the temperature rise of the power transmitting system and the first electric motor, whereby the fuel economy of the hybrid vehicle is improved.

(4) The control apparatus according to any one of the above-described modes (1)-(3), wherein when the temperature of the power transmitting system is not lower than the predetermined threshold value, the differential-state-switching-condition changing portion maintains the differential-state switching condition that is determined so as to place the differential mechanism in one of the differential and non-differential states in which fuel economy of the hybrid vehicle is higher while the power transmitting system is placed in a fully warmed-up state.

In the above-described mode (4) of this invention, the differential-state switching condition determined so as to place the differential mechanism in one of the differential and non differential states in which the fuel economy of the hybrid vehicle is higher while the power transmitting system is placed in the fully warmed-up state is maintained when the temperature of the power transmitting system is not lower than the threshold value. Accordingly, once the power transmitting system is fully warmed up, the differential-state switching condition determined as described above is not changed, and the differential mechanism is placed in the differential or non-differential state according to that differential-state switching condition.

(5) The control apparatus according to any one of the above-described modes (1)-(4), wherein the differential-state-switching-condition changing portion changes the differential-state switching condition so as to enlarge a differential region for placing the differential mechanism in the differential state, with a decrease of the temperature of the power transmitting system.

In the above-described mode (5) of the invention, the differential-state switching condition is changed so as to enlarge the differential region for placing the differential mechanism in the differential state, as the temperature of the power transmitting system is lowered. The enlargement of the differential region results in an increase of the opportunity of operation of the first electric motor, so that the warm-up operation of the power transmitting system is promoted by the operation of the first electric motor, with a decrease of the temperature of the power transmitting system, whereby the warm-up operation can be expedited when the temperature of the system is relatively low.

(6) The control apparatus according to any one of the above-described modes (1)-(5), further comprising a fluid temperature determining portion configured to determine, as the temperature of the power transmitting system, a temperature of a fluid used to cool or lubricate the differential mechanism and the first electric motor.

In the above-described mode (6) of the present invention, the temperature of the fluid used to cool or lubricate the differential mechanism and the first electric motor is determined as the temperature of the power transmitting system. Accordingly, the warm-up operation of the power transmitting system can be promoted by raising the temperature of the fluid to raise the temperature of the differential mechanism and the first electric motor cooled or lubricated by the fluid, by increasing the opportunity of operation of the first electric motor in the differential state of the differential mechanism, for example.

(7) The engine staring control apparatus according to any one of the above-described modes (1)-(6), wherein the differential portion is operable as a continuously-variable transmission by controlling the operating state of the first electric motor.

In the above-described mode (7) of this invention, the differential portion is operable as the continuously-variable transmission when the operating state of the first electric motor is controlled, so that a vehicle drive toque produced by the differential portion can be smoothly changed. In this respect, it is noted that the differential portion is operable not only as the electrically controlled continuously-variable transmission the speed ratio of which is continuously variable, but also as a step-variable transmission the speed ratio of which is variable in steps.

(8) The engine starting control apparatus according to any one of the above-described modes (1)-(7), wherein the power transmitting system further includes a second electric motor connected to a power transmitting path between the differential portion and a drive wheel of the hybrid vehicle, and the differential-state-switching-condition changing portion does not change the differential-state switching condition irrespective of the temperature of the power transmitting system, when a temperature of the first or second electric motor is not lower than a predetermined threshold value.

In the above-described mode (8) of this invention, the differential-state switching condition is not changed irrespective of the temperature of the power transmitting system, when the temperature of the first or second electric motor is not lower than the predetermined threshold value. Namely, the warm-up operation of the power transmitting system should not be positively promoted when the temperature of the first or second electric motor is sufficiently high. This mode of the invention prevents an excessive rise of the temperature of the first and second electric motors due to unnecessary promotion of the warm-up operation of the power transmitting system. Alternatively, the amount of change of the differential-state switching condition by the differential-state-switching-condition changing portion is limited when the temperature of the first or second electric motor is equal to or higher than the threshold value. This modification permits not only the promotion of the warm-up operation of the power transmitting systems but also prevention of overheating of the first and second electric motors.

(9) The engine starting control apparatus according to the above-described mode (8), wherein

BRIEF DESCRIPTION OF THE DRAWINGS

The above and other objects, features, advantages and technical and industrial significance of this invention will be better understood by reading the following detailed description of preferred embodiments of the invention, when considered in connection with the following drawings, in which:

FIG. 1 is a schematic view showing an arrangement of a power transmitting system of a hybrid vehicle to which the present invention is applicable;

FIG. 2 is a table indicating shifting actions of the hybrid vehicle power transmitting system of FIG. 1, which is operable in a selected one of a continuously-vale shifting state and a step-variable shifting state, in relation to different combinations of operating states of hydraulically operated frictional coupling devices to effect the respective shifting actions.

DETAILED DESCRIPTION OF PREFERRED EMBODIMENT

[First Embodiment]

Figure 5:
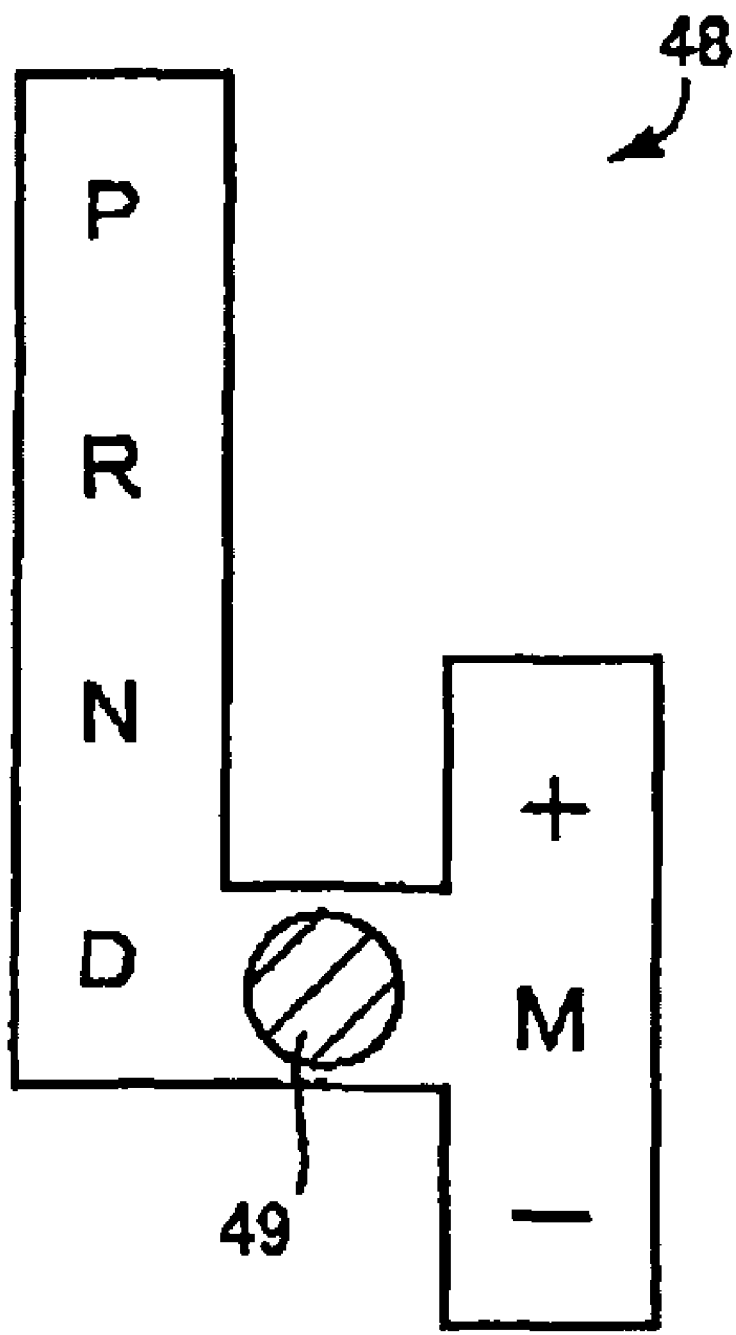
FIG. 5 is a manually operable shifting device including a shift lever having a plurality of shift positions.

Referring to the schematic view of FIG. 1, there is shown a transmission mechanism 10 constituting a part of a power transmitting system for a hybrid vehicle, which power transmitting system is controlled by a control apparatus according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not show a step-variable or multiple-step transmission portion in the form of an automatic transmission portion 20 disposed between the differential portion 11 and drive wheels 38 (shown in FIG. 6) of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16, which is a differential mechanism, includes as major components a planetary gear set 24 of a single pinion type having a gear ratio $\rho 0$ of about 0.418, for example, a switching clutch C0 and a switching brake B1. The planetary gear set 24 of the power distributing mechanism 16 has rotary elements consisting of: a sun gear S0, a planetary gear P0; a first carrier CA0 supporting the planetary gear P0 such that the planetary gear P0 is rotatable about its axis and about the axis of the san gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio ρ0 is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The switching brake B0 is disposed between the sun gear S0 and the casing 12, and the swing clutch C0 is disposed between the sun gear S0 and the carrier CA0. When the switching clutch C0 and brake B0 are both released, the power distributing mechanism 16 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio γ0 (rotating speed of the input shaft 14/rotating speed of the power transmitting member 18) of the power distributing mechanism 16 is continuously changed from a minimum value γ0min to a maximum value γ0max, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail when the switching clutch C0 is engaged, the sun gear S0 and the carrier CA0 are connected together, so that the power distributing mechanism 16 is placed in the locked state in which the three rotary elements of the planetary gear set 24 consisting of the first sun gear S1, first carrier CA0 and ring gear R0 are rotatable as a unit, namely, placed in a first non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio γ0 equal to 1. When the switching brake B0 is engaged in place of the switching clutch C0, the sun gear S0 is fixed to the casing 12, so that the power distributing mechanism 16 is placed in the locked state in which the sun gear S0 is not rotatable, namely, placed in a second non-differential state in which the differential function is not available, so that the differential portion 11 is also placed in the non-differential state. Since the rotating speed of the first ring gear R1 is made higher than that of the carrier CA0, the differential portion 11 is placed in the fired-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios. The switching clutch C0 and switching brake B0, which are operable to switch the shifting state of the differential portion 11 (power distributing mechanism 16) to the locked state, can be considered to be a differential limiting device.

The automatic transmission portion 20 is a transmission portion functioning as a step-variable automatic transmission the speed ratio of which is variable in steps. The speed ratio is a ratio of a rotating speed $N_{18}$ of the power transmitting member 18 to a rotating speed $N_{OUT}$ of the output shaft 22. This automatic transmission portion 20 includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first zing gear R1 meshing with the first sun gear S1 through the first planetary gear P1. For example, the first planetary gear set 26 has a gear ratio ρ1 of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.425. The third planetary gear set 30 has: a third sun gear S3; a third planetary gear P8; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio ρ3 of about 0.421. Where the numbers of teeth of the first sun gear S1, first ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios ρ1, ρ2 and ρ3 are represented by ZS1/ZR1, ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cutoff state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The transmission mechanism 10 constructed as described above is placed in a selected one of a first gear position (first speed position) through a fifth gear position (fifth speed position), a reverse gear position (rear drive position) and a neural position, by engaging actions of a corresponding combination of the two frictional coupling devices selected from the above-described switching clutch C0, first clutch C1, second clutch C2, switching brake D0, first brake B1, second brake B2 and third brake 133, as indicated in the table of FIG. 2. The above-indicated positions have respective speed ratios $\gamma T$ (input shaft speed $N_{IN}$/output shaft speed $N_{OUT}$) which change as geometric series. The power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio $\gamma 1$ of about 3.357, for example, is established by engaging actions of the switching clutch C0, first clutch C1 and third brake B3, and the second gear position having the speed ratio $\gamma 2$ of about 2.180, for example, which is lower than the speed ratio $\gamma 1$, is established by engaging actions of the switching clutch C0, first dutch C1 and second brake B2, as indicated in FIG. 2. Further, the third gear position having the speed ratio $\gamma 3$ of about 1.424, for example, which is lower than the speed ratio $\gamma 2$, is established by engaging actions of the switching clutch C0, first clutch C1 and first brake B1, and the fourth gear position having the speed ratio $\gamma 4$ of about 1,000, for ample, which is lower than the speed ratio $\gamma 3$, is established by engaging actions of the switching clutch C0, first clutch C1 and second clutch C2. The fifth gear position having the speed ratio $\gamma 5$ of about 0.705, for example, which is smaller than the speed ratio 14, is established by engaging actions of the first clutch C1, second clutch C2 and switching brake B0. Further, the reverse gear position having the speed ratio $\gamma R$ of about 3.209, for example, which is intermediate between the speed ratios $\gamma 1$ and $\gamma 2$, is established by engaging actions of the second clutch C2 and the third brake B3. The neutral position N is establishing by releasing all of the clutches C0, C1, C2 and brakes B0, B1, B2, B2.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transfusion, while the automatic transmission portion 20 connected in series to the differential portion 11 functions as the step-variable transmission, whereby the speed of the rotary motion transmitted to the automatic transmission portion 20 placed in a selected gear position M, namely, the rotating speed of the power transmitting member 18 is continuously changed, so that the speed ratio of the power transmitting system when the automatic transmission portion 20 is placed in the selected gear position M is continuously variable over a predetermined range. Accordingly, the overall speed ratio $\gamma T$ of the transmission mechanism 10 determined by the speed ratio $\gamma 0$ of the differential portion 11 and the speed ratio $\gamma$ of the automatic transmission portion 20 is continuously variable.

Figure 3:
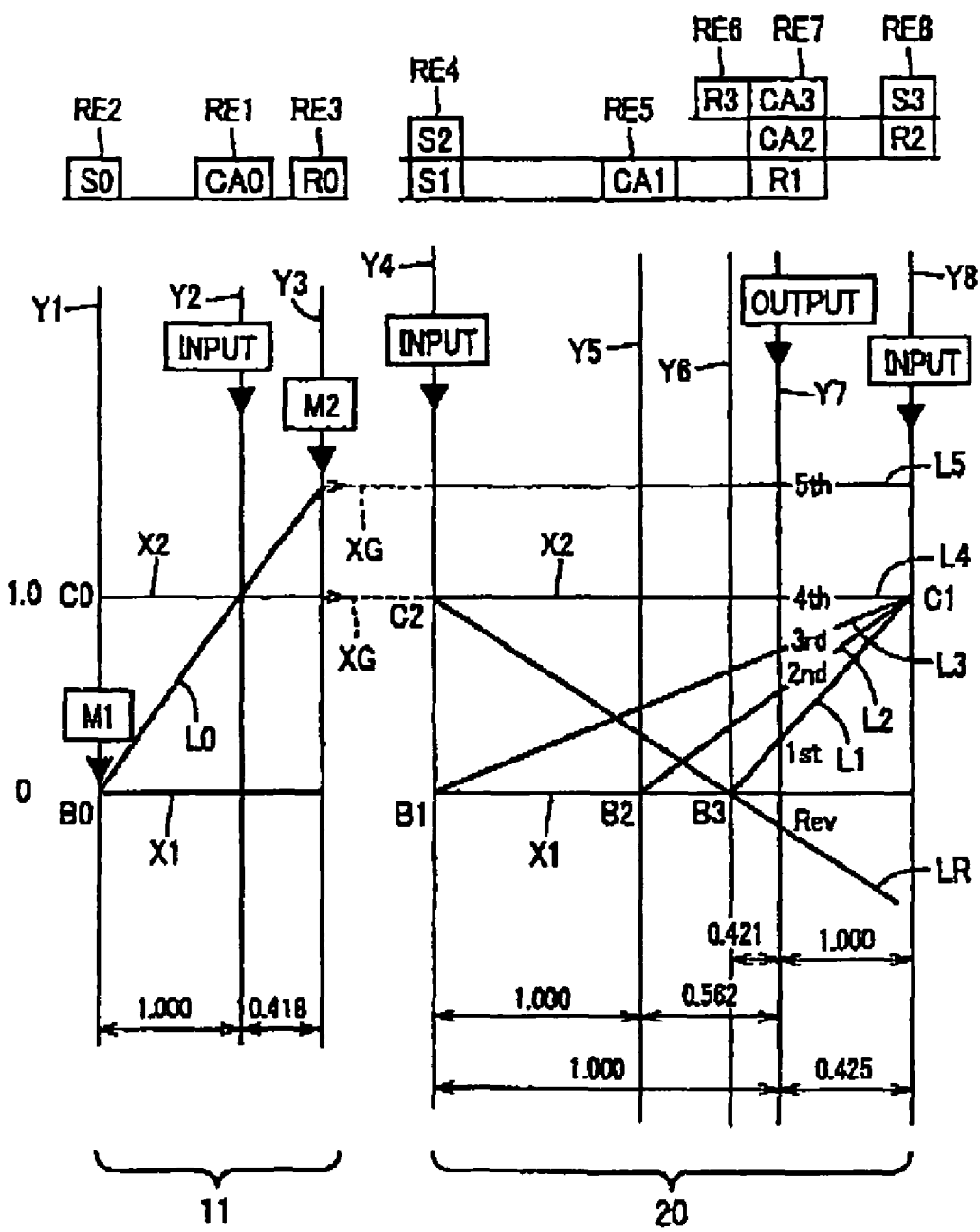
FIG. 3 is a collinear chart indicating relative rotating speeds of the hybrid vehicle power transmitting system of FIG. 1 operated in the step-variable shifting state, in different gear positions of the power transmitting system.

The collinear chart of FIG. 3 indicates, by straight lines, a relationship among the rotting speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the san gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA0) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the sun gear S0 represented by a point of intersection between the straight line L0 and the vertical line Y1 is raised or lowered by controlling the operating speed of the first electric motor M1, so that the rotating speed of the carrier CA0 represented by the sit line L0 and the vertical line Y2 is raised or lowered, if the rotating speed of the ring gear R0 determined by the vehicle speed V and represented by a point of intersection between the straight line L0 and the vertical line Y3 is substantially held constant. When the switching clutch C0 is engaged, the sun gear S0 and the carrier CA0 are connected to each other, and the power distributing mechanism 16 is placed in the first non differential state in which the above-indicated three rotary elements RE1, RE2, RE3 are rotated as a unit, so that the straight line L0 is aligned with the horizontal line X2, so that the power transmitting member 18 is rotated at a speed equal to the engine speed $N_E$. When the snitching brake B0 is engaged, on the other hand, the sun gear S0 is fixed to the casing 12, and the power distributing mechanism 16 is placed in the second non-differential state in which the power distributing mechanism 16 functions as a speed-increasing mechanism; so that the straight line L0 is inclined in the state indicated in FIG. 3, whereby the rotating speed of the ring gear R0 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fined to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$ with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
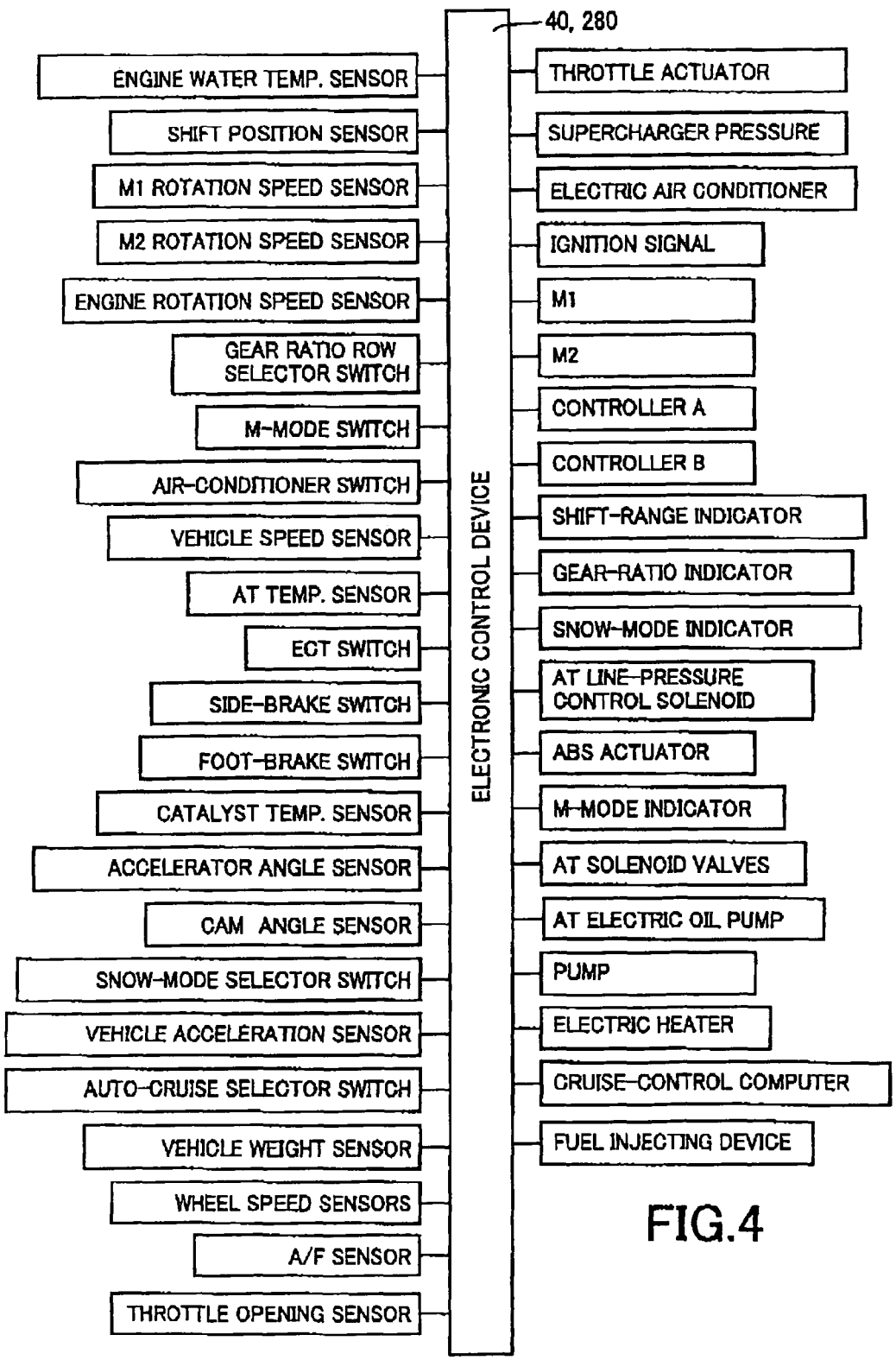
FIG. 4 is a view indicating input and output signals of an engine starting control apparatus in the form of an electronic control device according to one embodiment of this invention to control the power transmitting system of FIG. 1.

FIG. 4 indicates signals received by an electronic control device 40 which provided to control transmission mechanism 10 constituting a part of the hybrid vehicle power transmitting system and which functions as an engine starting control apparatus constructed according to the present embodiment of the invention. FIG. 4 also indicates signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever 49 (shown in FIG. 5) detected by a shift position sensor 44 (shown in FIG. 6); a signal indicative of an operating speed $N_{M1}$ of the first electric motor M1 (hereinafter referred to as "first electric motor speed $N_{M1}$"); a signal indicative of an operating speed $N_{M2}$ of the second electric motor M2 (hereinafter referred to as "second electric motor speed $N_{M2}$"); a signal indicative of the operating speed $N_E$ of the engine 8 detected by an engine speed sensor 46 (shown in FIG. 6); a signal indicative of a value indicating gear ratios of a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature $TEMP_{ATF}$ of a working oil or fluid of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; and a signal indicative of an air/fuel (A/F) ratio of an air-fuel mixture of the engine 8.

The electronic control device 40 is further arranged to generate various signals such as: control signals to be applied to an engine output control device 43 (shown in FIG. 6) to control the output of the engine 8, such as a drive signal to drive a throttle actuator 97 for controlling an angle of opening $\theta_{TH}$ of an electronic throttle valve 96 disposed in an intake pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner, signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater, and a signal to be applied to a cruise-control computer.

FIG. 5 shows an example of a manually operable shifting device in the form of a shifting device 48. The shifting device 48 includes the above-described shift lever 49, which is disposed laterally adjacent to an operator's seat, for example, and which is manually operated to select one of the plurality of shift positions $P_{SH}$.

The shift positions $P_{SH}$ consist of: a parking position P for placing the transmission mechanism 10 (more precisely, the automatic transmission portion 20) in a neutral state in which the power transmitting path is disconnected and in which the output shaft 22 of the automatic transmission portion 20 is locked; a reverse R for driving the vehicle in the rearward direction; a neutral position N for placing the transmission mechanism 10 in the neutral state; an automatic forward-drive shifting position D; and a manual forward-drive shifting position M. When the shift lever 49 is operated to the automatic forward-drive shifting position D, the transmission mechanism 10 is placed in an automatic shifting mode in which the overall speed ratio γT is automatically changed and is defined by the continuously variable speed ratio of the differential portion 11 and the speed ratio of an automatically selected one of the first through fifth gear positions of the automatic transmission portion 20. When the shift lever 49 is operated to the manual forward-drive shifting position M, the transmission mechanism 10 is placed in a manual shifting mode in which the highest gear position to which the automatic transmission portion 20 is automatically shiftable can be selected by operating the shift lever 49 from the manual forward-drive shifting position M to a position "+" or a position "−". That is, the automatically selectable gear positions of the automatic transmission portion 20 can be selected in the manual shifting mode.

When the shift lever 49 is operated to a selected one of the shift positions $P_{SH}$, the hydraulic control unit 42 is electrically switched to establish one of the reverse-drive position R, neutral position N and first through fifth gear positions that are indicated in the table of FIG. 2.

The above-indicated parking position P and the neutral position N of the shift lever 49 are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail a manual operation of the shift lever 49 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 49 from the neutral position N to the automatic forward-drive position D causes at least the first clutch C1 to be engaged for switching the power transmitting path in the automatic transmission portion 20 from the power-cut-off state to the power transmitting state. Further, a manual operation of the shift lever 49 from the reverse-drive position R to the parking position P or neutral position N causes the second clutch C2 to be released for switching the power transmitting path in the automatic transmission portion 20 from the power transmitting state to the power cutoff state. A manual operation of the shift lever 49 from the automatic forward-drive shifting position D to the neutral position N causes the first and second clutches C1, C2 to be released for switching the power transmitting path in the automatic transmission portion 20 from the power transmitting state to the power cut-off state.

Figure 6:
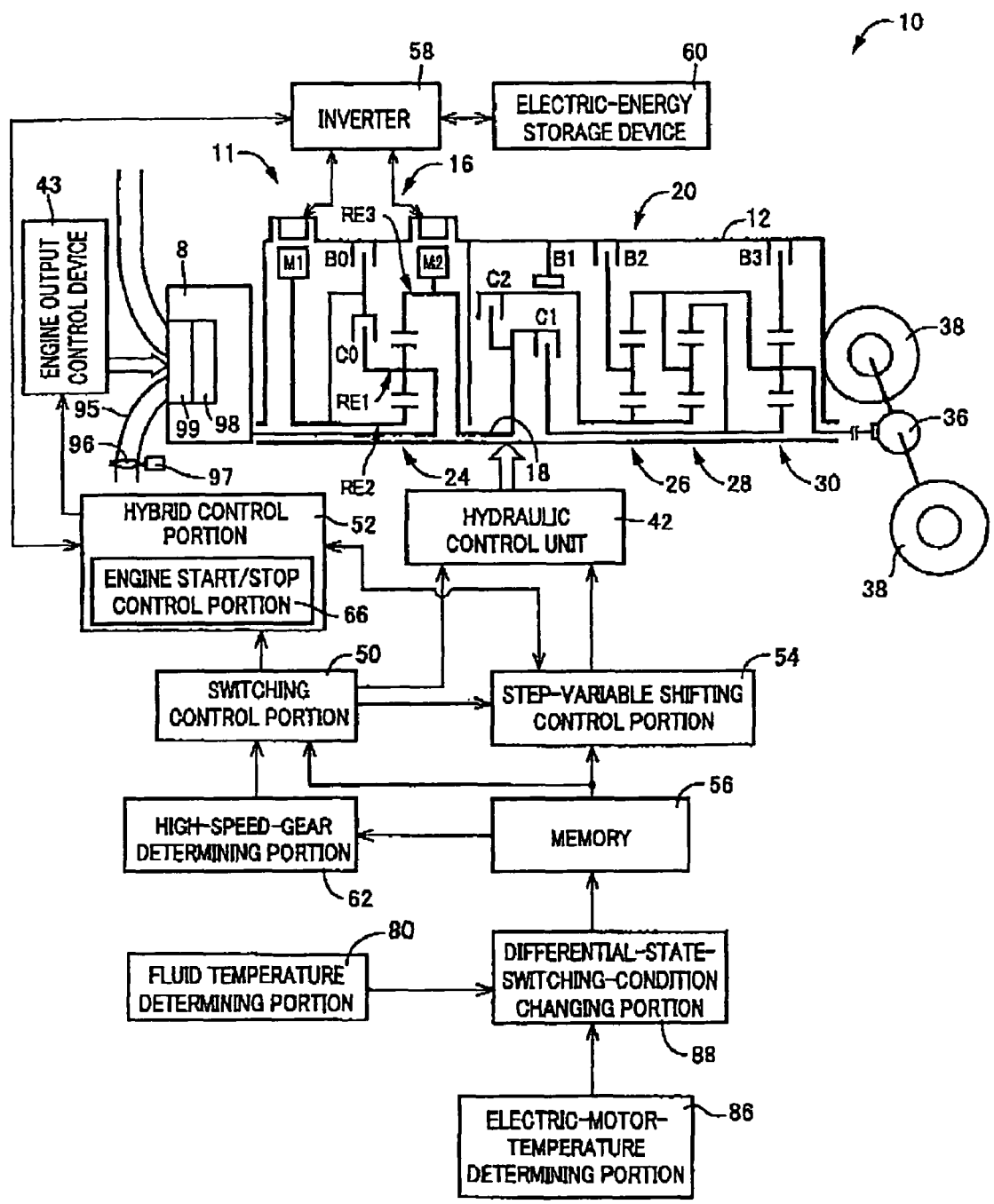
FIG. 6 is a functional block diagram illustrating major control functions of the electronic control device of FIG. 4.

FIG. 6 is a functional block diagram for explaining major control functions of the electronic control device 40, which includes a switching control portion 50, a hybrid control portion 52, a step-variable shifting control portion 54, a memory 56, a high-speed-gear determining portion 62, a fluid temperature determining portion 80, an electric-motor-temperature determining portion 86, and a differential-state-switching-condition changing portion 88. The step-variable shifting control portion 54 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in the memory 56 and which represents shift-up boundary lines indicated by solid lines in FIG. 7 and shift-down boundary lines indicated by one-dot chain lines in FIG. 7. The step-variable shifting control portion 54 generates commands (shifting commands or hydraulic control command) to be applied to the hydraulic control unit 42, to selectively engage and release the respective two hydraulically operated frictional coupling devices (except the switching clutch C0 and brake B0), for establishing the determined gear position of the automatic transmission portion 20 according to the table of FIG. 2. Described in detail, the step-variable shifting control portion 54 commands the hydraulic control unit 42 to control the solenoid-operated valves incorporated in the hydraulic control unit 42, for activating the appropriate hydraulic actuators to concurrently engage one of the two frictional coupling device and release the other frictional coupling device, to effect the clutch-to-clutch shifting actions of the automatic transmission portion 20.

The hybrid control portion 52 functions as the continuously-variable shifting control portion and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electrically controlled continuously variable transmission, while the transmission mechanism 10 is placed in the continuously-variable shifting state, that is, while the differential portion 11 is placed in the differential state. For instance, the hybrid control portion 52 calculates a target (required) vehicle output at the present running speed V of the vehicle, on the basis of the operating amount $A_{OC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed $N_E$ and torque $T_E$ of the engine 8, so as to obtain the calculated target engine output, and the amount of generation of the electric energy by the first electric motor M1.

The hybrid control portion 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and for efficient operation of the engine 8, and the rotating speed of the power transmitting member 18 determined by the vehicle speed V and the selected gear position of the transmission portion 20. That is, the hybrid control portion 52 determines a target value of the overall speed ratio $\gamma T$ of the transmission mechanism 10, so that the engine 8 is operated according to a stored highest-fuel-economy curve (fuel-economy map or relation) stored in memory means. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio $\gamma 0$ of the differential portion 11, so as to obtain the target value of the overall speed ratio γT, so that the overall speed ratio γT can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the power transmitting system is provided with an electric path through which an electric energy generated by conversion of a portion of a drive force of the engine 8 is converted into a mechanical energy.

The hybrid control portion 52 includes engine output control means functioning to control the engine 8, so as to provide a required output, by controlling the throttle actuator 97 to open and close the electronic throttle valve 96, and controlling an amount and timing of fuel injection by the fuel injecting device 98 into the engine 8, and/or the timing of ignition of the igniter by the ignition device 99, alone or in combination. For instance, the hybrid control portion 52 is basically arranged to control the throttle actuator 97 on the basis of the operating amount $A_{CC}$ of the accelerator pedal (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$.

Figure 7:
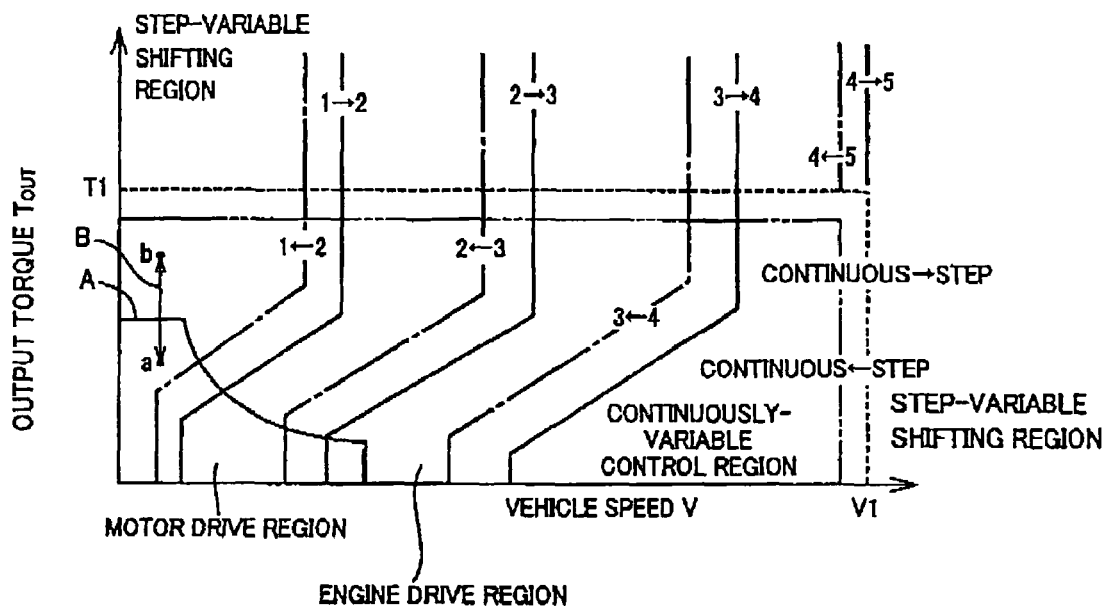
FIG. 7 is a view illustrating an example of a stored shifting boundary line map used for determining a shifting action of an automatic transmission portion, an example of a stored switching boundary line map used for switching the shifting state of a transmission mechanism of the power transmitting system, and an example of a stored drive-power-source switching boundary line map defining a boundary line between an engine drive region and a motor drive region for switching between an engine drive mode and a motor drive mode, in the same two-dimensional coordinate system defined by control parameters in the form of a rag speed and an output torque of the vehicle, such that those maps are related to each other.

Solid line A in FIG. 7 represents an example of a boundary line defining an engine-drive region and a motor-drive region, for switching the vehicle drive power source for staring and driving the vehicle, between the engine 8 and the second electric motor M2. In other words, the vehicle drive mode is switchable between an "engine drive mode" corresponding to the engine-drive region in which the vehicle is started and driven with the engine 8 used as the vehicle drive power source, and the "motor drive mode" corresponding to the motor-drive region in which the vehicle is driven with the second electric motor M2 used as the vehicle drive power source. A predetermined stored relationship representing the boundary line (solid line A) of FIG. 7 for switching between the engine drive mode and the motor drive mode is an example of a drive-power-source switching boundary line map (drive-power-source map) in a two-dimensional coordinate system defined by control parameters in the form of the vehicle speed V and a drive-force-related value in the form of the output torque $T_{OUT}$. This drive-power-source switching boundary line map is stored in the memory 56, together with the shifting boundary line map (shifting map) indicated by solid lines and one-dot chain lines in FIG. 7.

The hybrid control portion 52 determines whether the vehicle condition is in the motor-drive region or engine-drive region, and establishes the motor drive mode or engine drive mode. This determination is made on the basis of the vehicle condition represented by the vehicle speed V and the required output torque $T_{OUT}$, and according to the drive-power-source switching boundary line map of FIG. 7. As is understood from FIG. 7, the motor drive mode is generally established by the hybrid control portion 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor drive mode, the hybrid control portion 52 is arranged to hold the engine speed $N_E$ at zero or Substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control portion 52 is further arranged to switch the engine 8 between its operated state and non-operated states, for switching the vehicle drive mode between the engine drive mode and the motor drive mode. To this end, the hybrid control portion 52 includes an engine start/stop control portion 66. This engine start/stop control portion 66 is configured to start or stop the engine 8, according to one of the motor drive mode and the engine drive mode which is selected by the hybrid control portion 52 on the basis of the vehicle condition and according to the drive-power-source switching boundary line map indicated in FIG. 6 by way of example.

For instance, the engine start/stop control portion 66 energizes the first electric motor M1 to raise the first electric motor speed $N_{M1}$, that is, operates the first electric motor M1 to function as an engine starter to raise the engine speed $N_E$ to a suitable value $N_E'$ at which the engine 8 can be started by ignition by the ignition device 99, when the vehicle condition is changed from a point "a" to a point "b" as indicated by solid line in FIG. 6, namely, from the motor drive region to the engine drive region, as a result of an increase of the required output torque $T_{OUT}$ by depression of the accelerator pedal. Thus, the vehicle drive mode is changed from the motor drive mode to the engine drive mode. In this case, the engine start/stop control portion 66 may rapidly raise the first electric motor speed $N_{M1}$ to rapidly raise the engine speed $N_E$ to the suitable value $N_E'$, for preventing resonance vibration of the engine 8 which would take place upon its starting at a speed lower than an idling speed $N_{EID}$, as well known in the art.

When the vehicle condition is changed from the point "b" to the point "a" as indicated by the solid line in FIG. 7, namely, from the engine drive region to the motor drive region, as a result of a decrease of the required output torque $T_{OUT}$ by releasing of the accelerator pedal, on the other hand, the engine start/stop control portion 66 commands the fuel injecting device 98 to stop a supply of the fuel to the engine 8, that is, to implement a fuel cut of the engine 8, so that the vehicle drive mode is changed from the engine drive mode to the motor drive mode. In this case, the engine start/stop control portion 66 may rapidly lower the first electric motor speed $N_{M1}$ to rapidly lower the engine speed $N_E$ to zero or substantially zero, for preventing the above-indicated resonance vibration Alternatively, the engine start/stop control portion 66 may lowers the first electric motor speed $N_{M1}$ to lower the engine speed $N_E$ prior to the fuel cut of the engine 8, such that the fuel cut is implemented at the predetermined engine speed $N_E'$, to stop the engine 8.

The hybrid control portion 52 is further capable of performing a so-called "drive-force assisting" operation (torque assisting operation) to assist the engine 8, by supplying the second electric motor M2 with an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine drive mode.

The hybrid control portion 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control portion, 52 is further arranged to hold the engine speed $N_E$ at a desired value owing to the electric CVT function of the differential portion 11, by controlling the first electric motor speed $N_{M1}$ and/or second electric motor speed $N_{M2}$, irrespective of whether the vehicle is stationary or running. For example, the hybrid control portion 52 is arranged to raise the engine speed $N_E$ by raising the first electric motor speed $N_{M1}$ while the second electric motor speed $N_{M2}$ determined by the vehicle speed V is held substantially constant, as is apparent from the collinear chart of FIG. 3.

The high-speed-gear deter portion 62 is arranged to determine whether the gear position to which the transmission mechanism 10 should be shifted on the basis of the vehicle condition and according to the sting boundary line map stored in the memory 56 and indicated in FIG. 6 by way of example is a high-speed-gear position, for example, the fifth gear position. This determination is made by determining whether the gear position selected by the step-variable shifting control portion 54 is the fifth gear position or not, for deters which one of the switching clutch C0 and brake B0 should be engaged to place the transmission mechanism 10 in the step-variable shifting state.

The switching control portion 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control portion 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory 56 and indicated by two-dot chain line in FIG. 7 by way of example, namely, whether the vehicle condition is in a continuously-variable shifting region (a differential region) for placing the transmission mechanism 10 in the continuously-variable shifting state, or in a step-variable sag region (a non differential region) for placing the transmission mechanism 10 in the step-variable shifting state. The switching control portion 50 places the transmission mechanism 10 in the continuously-variable shifting state or step-variable shifting state, depending upon whether the vehicle condition is in the continuously-variable shifting region or in the step-variable shifting region. Thus, the switching control portion 50 limits the electrically controlled differential function of the differential portion 11 by placing the differential portion 11 in the step-variable shifting state by controlling the switching clutch C0 and/or the switching brake B0.

Described in detail, when the switching control portion 50 determines that the vehicle condition is in the step-variable shifting region, the switching control portion 50 disables the hybrid control portion 52 to implement a hybrid control or continuously-variable shifting control, and enables the step-variable shifting control portion 54 to implement a predetermined step-variable shifting control in which the transmission portion 20 is automatically shifted according to the shifting boundary line map stored in the memory 56 and indicated in FIG. 6 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining portion 62 has determined that the transmission mechanism 10 should be shifted to the fifth gear position, the switching control portion 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining portion 62 has not determined that the transmission mechanism 10 should be shifted to the fifth gear position, the switching control portion 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control portion 50, the differential portion 11 operable as the auxiliary transmission is placed in a selected one of two gear positions under the control of the switching control portion 50 while the automatic transmission portion 20 connected in series to the differential portion 11 functions as a step-variable transmission, so that the transmission mechanism 10 as a whole functions as the so-called step-variable automatic transmission.

When the switching control portion 50 has determined that the vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the differential portion 11 in the continuously-variable shifting state. At the same time, the switching control portion 50 enables the hybrid control portion 52 to implement the hybrid control, and commands the step-variable shifting control portion 54 to select and hold a predetermined one of the gear positions, or to permit the automatic transmission portion 20 to be automatically shifted according to the shifting boundary line map stored in the memory 56 and indicated in FIG. 7 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control portion 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 7 will be described in detail. The shifting boundary line map (shifting control map or relation) shown in FIG. 7 by way of example and stored in the memory 56 is used for determining whether the automatic transmission portion 20 should be shifted, and is defined in a two dimensional coordinate system by control parameters consisting of the vehicle speed V and the drive-force-related value in the form of the required output torque $T_{OUT}$. In FIG. 6, the solid lines indicate the chit-up boundary lines, while the one-dot chain lines indicate the shift-down boundary lines.

The broken lines in FIG. 7 represent the upper vehicle-speed limit V1 and the upper output-torque limit T1 which are used for the switching control portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output ruing state. The output torque $T_{OUT}$ is an example of the drive-force-related value which relates to the drive force of the hybrid vehicle. FIG. 7 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 7 constitute the stored switching pattern or boundary line map (switching control map or relation) used by the switching control portion 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control portion 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control portion 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
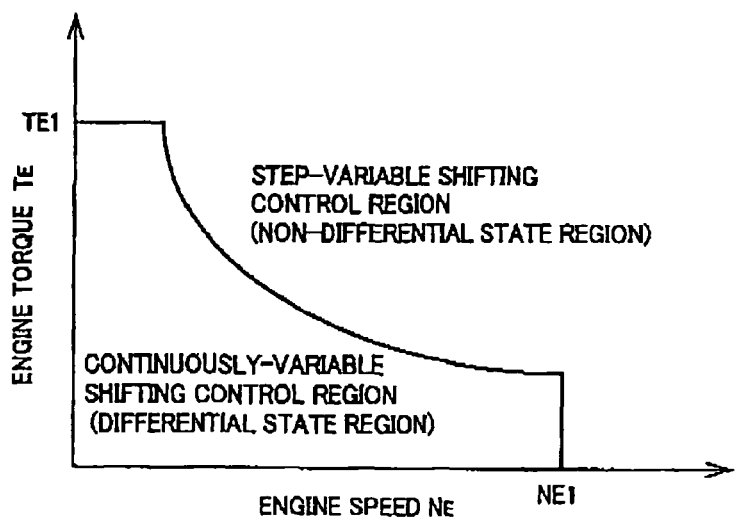
FIG. 8 is a view illustrating a stored switching pattern or relationship defining a boundary line between a continuously-variable shifting region and a step-variable shifting region, which relationship is used to map the boundary line of the switching boundary line map defining the continuously-variable and step-variable shifting regions which are indicated by broken lines in FIG. 7.

Referring to FIG. 8, there is shown a switching pattern or boundary line map (switching control map or relation) which is stored in the memory 56 and which defines engine-output lines serving as a boundary line used by the switching control portion 50 to determine whether the vehicle condition is in the step-variable or continuously-variable shifting region. These engine-output lines are defined by control parameters in the form of the engine speed $N_E$ and the engine torque $N_T$. The switching control portion 50 may use the switching boundary line map of FIG. 8 in place of the switching boundary line map of FIG. 7, to determine whether the vehicle condition is in the continuously-variable or step-variable shifting region, on the basis of the engine speed $N_E$ and engine torque $T_E$. The switching boundary line map of FIG. 7 may be based on the switching boundary line map of FIG. 7. In other words, the broken lines in FIG. 7 may be determined on the basis of the relation (map) of FIG. 8, in the two dimensional coordinate system defined by the control parameters in the for of the vehicle speed V and the output torque $T_{OUT}$.

The step-variable shifting region defined by the switching boundary line map of FIG. 7 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit $T_{E1}$, or a high-speed drive region in which the engine speed $N_E$ is not lower than the predetermined threshold value $N_{E1}$, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary line of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, mad it possible to minimize the required sizes of the first electric motor M1 and the second electric motor M2, and the required size of the power transmitting system including those electric motors. According to the other concept, the transmission mechanism 10 is placed in the step-variable shining state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up.

Thus, the differential portion 11 (transmission mechanism 10) is selectively switchable between the continuously-variable shifting state and the step-variable shifting state (fixed-speed ratio shifting state), by the switching control portion 50 on the basis of the vehicle condition. In the present embodiment, the hybrid control portion 52 selects one of the motor drive mode and the engine drive mode on the basis of the vehicle condition, and the engine start/stop control portion 66 selectively start or stop the engine 8 according to the selected vehicle drive mode.

The working oil or fluid used for the automatic transmission portion 20 of the transmission mechanism 10 is also used as a fluid for cooling the first and second electric motors M1, M2, and as a lubricant for lubricating the planetary gear set 24 of the differential portion 11, and the first, second and third planetary gear sets 26, 28 and 30 of the automatic transmission portion 20. When the temperature $TEMP_{ATF}$ of the working fluid is lower than a lower limit, that is, before the warm-up operation of the transmission mechanism 10 is completed, the viscosity of the working fluid is relatively high, causing a relatively high resistance to rotary motions of the gears used in the transmission mechanism 10, so that the power transmission efficiency of the power transmitting path is relatively low, unfavorably resulting in relatively low fuel economy of the hybrid vehicle. In other words, the fuel economy can be improved by expediting the warm-up operation of the transmission mechanism 10 or completing the warm-up operation as soon as possible. For example, the warm-up operation of the transmission mechanism 10 is promoted or expedited if the amount of heat generated by the first and second electric motors M1, M2 and the other components that are cooled or lubricated by the working fluid is increased to raise the working fluid temperature $TEMP_{ATF}$. Since the first and second electric motors M1, M2 and the other components are accommodated within the casing 12, as shown in FIG. 6, an increase of the amount of heat generated by those components has a direct contribution to the promotion or early completion of the warm-up operation of the transmission mechanism 10.

For improving the fuel economy of the hybrid vehicle, the electronic control device 40 is configured to promote or expedite the warm-up operation of the transmission mechanism 10, as described below in detail.

Referring back to the functional block diagram of FIG. 6, the fluid temperature determining portion 80 to determine whether the temperature of the hybrid vehicle power transmitting system in the form of the transmission mechanism 10 is lower than a first threshold value $TEMP_1$. For example, the temperature of the transmission mechanism 10 is detected as the working fluid temperature $TEMP_{ATF}$ by a suitable temperature sensor. The first threshold value $TEMP_1$ is obtained by experimentation, as a threshold of the temperature $TEMP_{ATF}$ above which it is not necessary or not desirable to promote the warm-up operation of the transmission mechanism 10. Thus determined threshold value TEMP1, which is for example 35° C., is stored in the fluid temperature determining portion 80. If the transmission mechanism 10 is placed in a fully warmed-up state, it is not necessary to change the switching boundary line map of FIG. 8. The first threshold value TEMP1 is lower than the temperature of the transmission mechanism 10 placed in the fully warmed-up state.

The fluid temperature determining portion 80 is further configured to determine whether the temperature of the transmission mechanism 10 is lower than a second threshold value TEMP$_2$, which is lower than the first threshold value TEMP$_1$. The second threshold value EMP$_2$ is also obtained by experimentation, as a threshold of the temperature TEMP$_{ATF}$ below which it is absolutely necessary to promote or expedite the warm-up operation of the transmission mechanism 10 for improving the fuel economy of the hybrid vehicle. However, it is necessary to promote the warm-up operation when the temperature of the transmission mechanism 10 is between the first and second threshold values TEMP$_1$ and TEMP$_2$. The thus determined second threshold value, TEMP2, which is for example 0° C., is also stored in the fluid temperature determining portion 80.

The electric-motor-temperature determining portion 86 is configured to determine whether the temperature of the first electric motor M1 is lower than a third threshold value TEMP$_3$, in other words, whether the temperature of the first electric motor M1 is equal to or higher than the third threshold value TEMP$_3$. The temperature of the first electric motor M1 is detected by a suitable temperature sensor. The third threshold value TEMP$_8$ is obtained by experimentation, as a threshold above which the promotion of the warm-up operation of the transmission mechanism 10 by operation of the first electric motor M1 should be restricted for the purpose of preventing overheating of the first electric motor M1. The thus determined third threshold value TEMP$_8$, which is for example 150° C., is stored in the electric-motor-temperature determining portion 86. Although the present embodiment is arranged such that the electric-motor-temperature determining portion 86 determines whether the temperature of the first electric motor M1 is lower or higher than the third threshold value TEMP$_3$, the electric-motor-temperature determining portion 86 may be configured to determine whether the temperature of the second electric motor M2, or the average of the temperatures of the first and second electric motors M1, M2 is lower or higher than a third threshold value TEMP$_8$ which is suitably determined.

Figure 9:
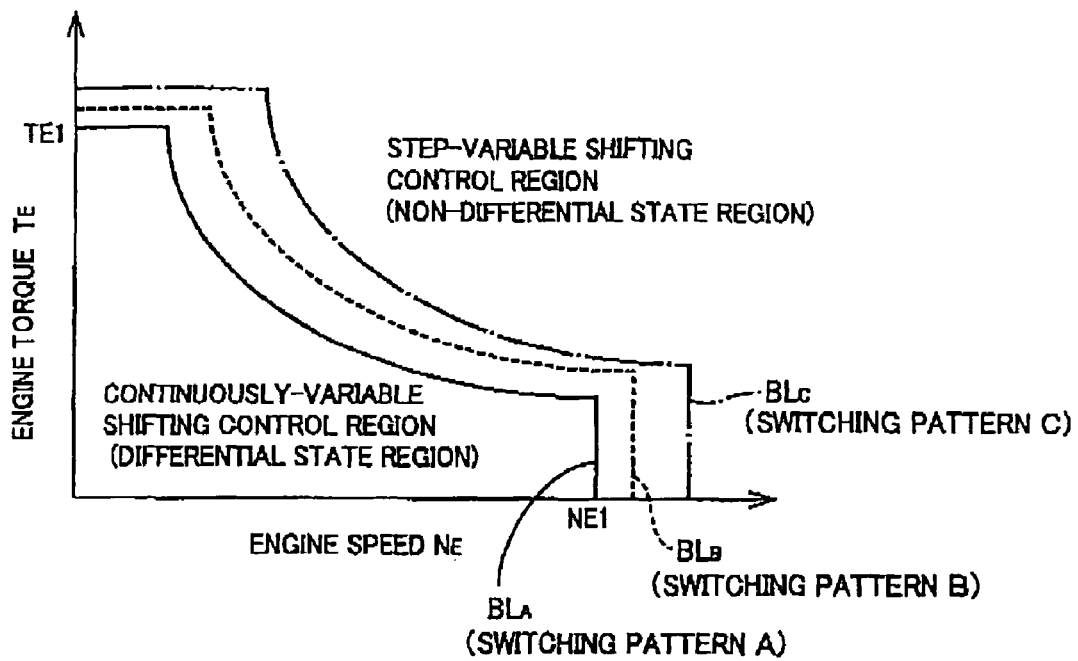
FIG. 9 is a view for explaining an operation of a dufferebtuak0staet-switcgubg-condition changing portion shown in FIG. 7, to change the switching boundary line map of FIG. 8, wherein a switching pattern B corresponds to the switching pattern or switching boundary line map of FIG. 8.

A switching pattern A shown in FIG. 9 is the same as the switching boundary line map shown in FIG. 8, and is used when it is not necessary to promote the warm-up operation of the transmission mechanism 10. Switching patterns B and C also shown in FIG. 9 are used when it is necessary to promote the warm-up operation. Namely, the switching pattern A is changed to the switching pattern B or C, by the differential-state-switching-condition changing portion 88, as described below. Each of the switching patterns A, B and C defines the continuously-variable shifting region in which the power distributing mechanism 16 should be placed in the differential state, and the step-variable shifting region in which the power distributing mechanism 16 should be placed in the non-differential state. The switching boundary line indicated by broken line in FIG. 7, and the switching boundary line indicated by one-dot chain line in FIG. 7 are determined on the basis of the switching boundary line of the switching boundary line map of FIG. 8. When the switching boundary line map of FIG. 8 (switching pattern A of FIG. 9) is changed to the switching pattern B or C, the boundary lines indicated by the broken and one-dot chain lines in FIG. 7 are accordingly changed. The switching pattern or switching boundary line map of FIG. 8 according to which the power distributing mechanism 16 is placed in the differential state or non-differential state may be considered to be a differential-state switching condition on the basis of which the power distributing mechanism 16 is switched from the differential state to the non-differential state or vice versa. The switching patterns A, B and C of FIG. 9 are stored in the electronic control device 40.

The switching pattern A represented by a boundary line BL$_A$ indicated in FIG. 9, which is identical with the switching boundary line map of FIG. 8 is used when the transmission mechanism 10 is placed in the fully warmed-up state. The switching pattern A is the differential-state switching condition determined to place the power distributing mechanism 16 in one of the differential and non-differential states in which the fuel economy is higher, when the transmission mechanism 10 is placed in the fully warmed-up state. That is, the switching pattern is determined to maximize the fuel economy of the hybrid vehicle by adequately selecting either the differential state or the non-differential state of the power distributing mechanism 16.

The switching pattern B represented by a boundary line BL$_B$ indicated in FIG. 9 is shifted with respect to the switching pattern A in the direction of increase of the engine speed N$_E$ and in the direction of increase of the engine torque T$_E$, so as to enlarge the continuously-variable shifting region (differential region), as is understood from FIG. 9. In other words, the boundary line BL$_B$ is shifted with respect to the boundary line BL$_A$, in the directions of increase of the engine speed N$_E$ and engine torque T$_E$.

The switching pattern C represented by a boundary line BL$_C$ indicated in FIG. 9 is shifted with respect to the switching pattern B in the direction of increase of the engine speed N$_E$ and in the direction of increase of the engine torque T$_E$, so as to enlarge the continuously-variable shifting region, as is understood from FIG. 9. In other words, the boundary line BL$_C$ is shifted with respect to the boundary line BL$_B$, in the directions of increase of the engine speed N$_E$ and engine torque T$_E$.

When the fluid temperature determining portion 80 determines that the temperature of the transmission mechanism 10 (hybrid vehicle power transmitting system) is equal to or higher than the first threshold value TEMP$_1$, the differential-state-switching-condition changing portion 88 selects the switching pattern A represented by the boundary line BL$_A$ (solid line indicated in FIG. 9). Namely, the switching boundary lime map of FIG. 8 is maintained.

When the fluid temperature determining portion 80 determines that the temperature of the transmission mechanism 10 is lower than the first threshold value TEMP$_1$, the differential-state-switching-condition changing portion 88 changes the differential-state switching condition from the switching pattern A to the switching pattern B or C, to rapidly raise at least one of the temperatures of the transmission mechanism 10 and the first electric motor M1. Namely, the differential-state-switching-condition changing portion 88 selects the switching pattern B or C to enlarge the differential or continuously-variable shifting region (for placing the power distributing mechanism 16 in the differential state), with a decrease of the temperature of the transmission mechanism 10, for increasing the opportunity of operations of the first and second electric motors M1, M2 that are cooled by the working fluid of the automatic transmission portion 20. Described in detail, the differential-state-switching-condition changing portion 88 selects the switching pattern B when the fluid temperature determining portion 80 determines that the temperature of the transmission mechanism 10 is lower than the first threshold value $TEMP_1$ but is not lower than the second threshold value $TEMP_2$. That is, the differential-state-switching-condition changing portion 88 changes the boundary line $BL_A$ to the boundary line $BL_B$ (broken line indicated in FIG. 9) Further, the differential-state-switching-condition changing portion 88 selects the switching pattern C when the fluid temperature determining portion 80 determines that the temperature of the transmission mechanism 10 is lower than the second threshold value $TEMP_2$. That is, the differential-state-switching-condition changing portion 88 changes the boundary line $BL_A$ to the boundary line $BL_C$ (one-dot chain line in FIG. 9)

If the electric-motor-temperature determining portion 86 determines that the temperature of the first electric motor M1 is not lower than the third threshold value $TEMP_3$, the differential-state-switching-condition changing portion 88 does not select the switching pattern C, but selects the switching pattern B, even when the fluid temperature determining portion 80 determines that the temperature of the transmission mechanism 10 is lower than the second threshold value $TEMP_2$. However, the differential-state-switching-condition changing portion 88 may select or maintain the switching pattern A (switching boundary line map or pattern of FIG. 8 defining the narrowest continuously-variable shifting region) when the electric-motor-temperature determining portion 86 determines that the temperature of the first electric motor M3 is equal to or higher than the third threshold value $TEMP_3$ (when the first electric motor M1 has a sufficiently high temperature), irrespective of the determination of the fluid temperature determining portion 80

Figure 10:
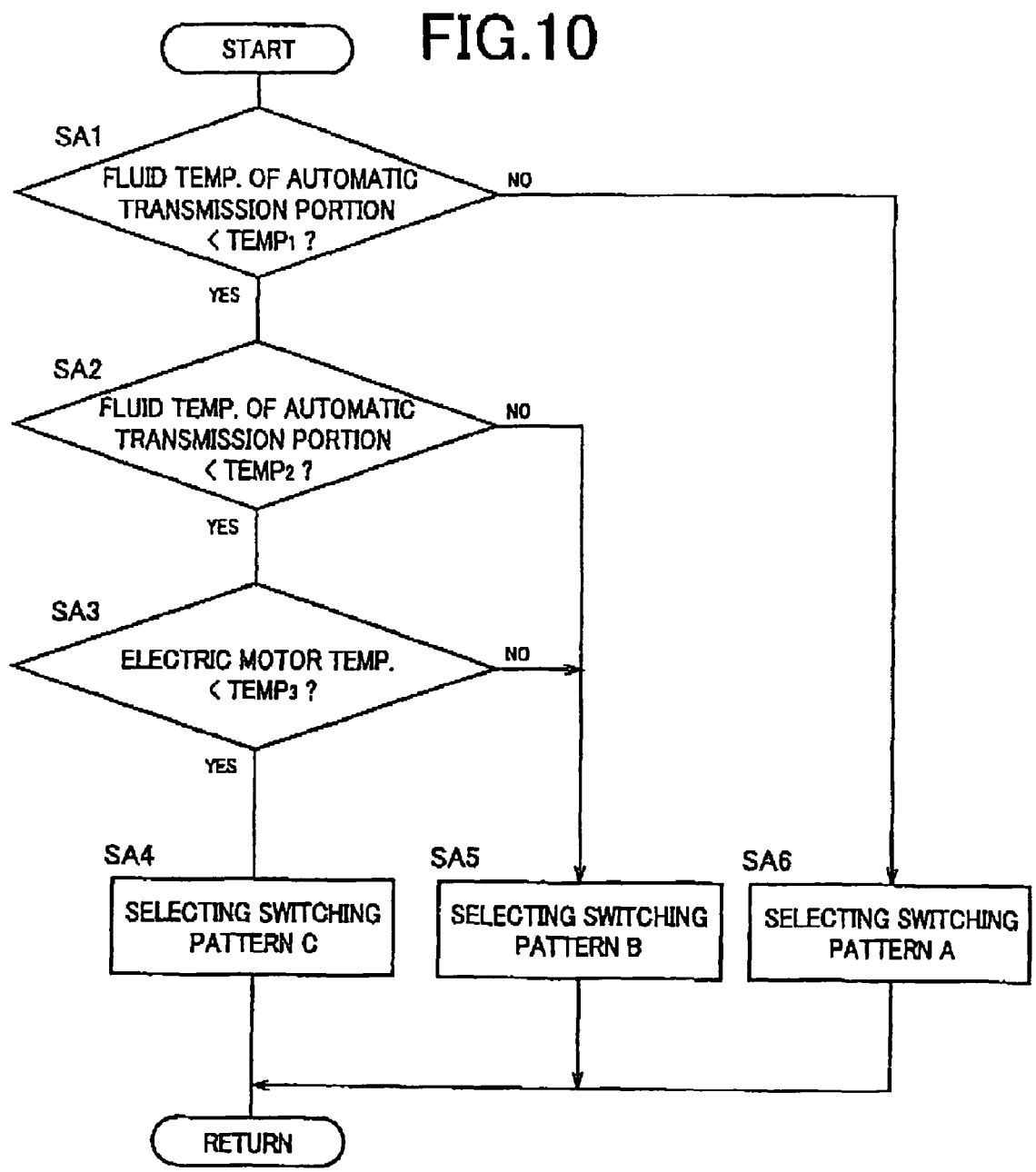
FIG. 10 is a flow chart illustrating a control routine executed by the electronic control device of FIG. 4, to promote a warm-up operation of the transmission mechanism of the power transmitting system.

The flow chart of FIG. 10 illustrates a control routine executed by the electronic control device 40 to promote the warm-up operation of the transmission mechanism 10. The control routine is repeatedly executed with an extremely short cycle time of several milliseconds to several tens of milliseconds.

The control routine of FIG. 10 is initiated with step SA1 to determine whether the temperature of the transmission mechanism 10, more specifically, the temperature $TEMP_{ATF}$ of the working fluid of the automatic transmission portion 20 is lower than the first threshold value $TEMP_1$ (35° C., for example), which is stored in the fluid temperature determining portion 80. If an affirmative determination is obtained in step SA1, the control flow goes to step SA2. If a negative determination is obtained in step SA1, the control flow goes to step SA6.

Step SA2 is provided to determine whether the fluid temperature TEMPT is lower than the second threshold value $TEMP_2$ (0° C., for example), which is also stored in the fluid temperature determining portion 80. If an affirmative determination is obtained in step SA2, the control flow goes to step SA3. If a negative determination is obtained in step SA2, the control flow goes to step SA5. It will be understood that the above-indicated steps SA1 and SA2 correspond to the fluid temperature determining portion 80.

Step SA3 is provided to determine whether the temperature of the first electric motor M1 is lower than the third threshold value $TEMP_3$ (150° C., for example), which is stored in the electric-motor-temperature determining portion 86. If an affirmative determination is obtained in step SA3, the control flow goes to step SA4. If a negative determination is obtained in step SA3, the control flow goes to step SA5. Although step SA3 is provided to whether the temperature of the first electric motor M1 is lower or higher than the third threshold value $TEMP_3$, the step SA3 is formulated to determine whether the temperature of the second electric motor M2, or the average of the temperatures of the first and second electric motors M1, M2 is lower or higher than a third threshold value $TEMP_3$ which is suitably determined. It will be understood that step SA3 corresponds to the electric-motor-temperature determining portion 86.

Step SA4 is provided to select the switching pattern C represented by the boundary line $BL_C$ (one-dot chain line indicated in FIG. 9). That is, the switching pattern A (switching boundary line map of FIG. 8) is changed to the switching pattern C.

Step SA5 is provided to select the switching pattern B represented by the boundary line $BL_B$ (broken line indicated in FIG. 9). That is, the switching pattern A (switching boundary line map of FIG. 8) is changed to the switching pattern B.

Step SA6 is provided to select the switching pattern A represented by the boundary line $BL_A$ (solid line indicated in FIG. 9). That is, the switching pattern A is maintained. It will be understood steps SA4 through SA6 correspond to the differential-state-switching-condition changing portion 88.

The control apparatus in the form of the electronic control device 40 according to the present embodiment has the following advantages (A1)-(A7):

(A1) The differential-state switching condition in the form of the switching pattern or switching boundary line map used to switch the power distributing mechanism 16 between the differential state and the non-differential state is changed when the temperature of the transmission mechanism 10 is lower than the first threshold value $TEMP_1$. A change of the differential-state switching condition results in an increase of the opportunity of placing the power distributing mechanism 16 in the differential state in which the second electric motor M2 is operated to produce a mechanical energy, with an electric energy which is generated by the first electric motor M1 operated by a portion of the output of the engine 8 and which is supplied to the second electric motor M2 through the electric path. Accordingly, the amount of heat generated by the first and second electric motors M1, M2 is increased, with a result of a rise of the temperature $TEMP_{ATF}$ of the automatic transmission portion 20 which is also used to as the fluid for cooling the first and second electric motors M1, M2, so that the warm-up operation of the transmission mechanism 10 is expedited or promoted, and the fuel economy of the hybrid vehicle is improved.

(A2) The opportunity of operations of the first electric motor M1 and second electric motor M2 are increased, and the temperature $TEMP_{ATF}$ of the working fluid of the automatic transmission portion 20 used to cool the first and second electric motors M1, M2 is raised, as the continuously-variable shifting region of the power distributing mechanism 16 defined by the switching pattern or switching boundary line map is enlarged. In this respect, the present embodiment is configured to enlarge the continuously-variable shifting region of the power distributing mechanism 16 when the temperature of the transmission mechanism 10 is lower than the first threshold value $TEMP_1$. In other words, the switching boundary line map is changed to expedite the temperature rise of the transmission mechanism 10, first and second electric motors M1, M2, so that the warm-up operation of the transmission mechanism 10 can be expedited or promoted.

(A3) The differential-state switching condition is changed from the switching pattern A (boundary line map or pattern of FIG. 8) to the switching pattern B or switching pattern C. The switching pattern A is determined so as to place the power distributing mechanism 16 in one of the differential and non-differential states in which the fuel economy of the hybrid vehicle is higher while the transmission mechanism 10 is placed in the fully warmed-up state. Once the transmission mechanism 10 is fully warmed up, the switching pattern A is maintained, and the power distributing mechanism 16 is placed in the differential or non differential state according to the switching pattern A, so that the fuel economy of the hybrid vehicle is improved.

(A4) The second threshold value $TEMP_2$ is lower than the first threshold value $TEMP_1$ above which the switching pattern A (switching boundary line map of FIG. 8) is maintained, and the switching pattern B or C is selected depending upon whether the temperature of the transmission mechanism 10 is lower than the second threshold value $TEMP_2$ or not. The continuously-variable shifting region or differential region defined by the switching pattern B is larger than that defined by the switching pattern A, and the continuously-variable shifting region or differential region defined by the switching pattern C is larger than that defined by the switching pattern B. In other words, the switching pattern is changed so as to enlarge the differential region for placing the power distributing mechanism 16 in the differential state, with a decrease of the temperature of the transmission mechanism 10. The enlargement of the differential region results in an increase of the opportunity of operation of the first electric motor M1, so that the warm-up operation of the transmission mechanism 10 is promoted by the operation of the first electric motor M1, with a decrease of the temperature of the transmission mechanism 10, whereby the warm-up operation can be expedited when the temperature of the transmission mechanism 10 is relatively low.

(A5) The temperature of the power transmitting system in the form of the transmission mechanism 10 can be easily determined by the temperature $TEMP_{ATF}$ of the working fluid detected by the temperature sensor. Since the switching pattern is changed 60 as to enlarge the differential region of the power distributing mechanism 16 with a decrease of the fluid temperature $TEMP_{ATF}$, the opportunity of operation of the first electric motor M1 is increased with the decrease of the temperature of the transmission mechanism 101 so that the warm-up operation of the transmission mechanism 10 is promoted or expedited when the temperature of the transmission mechanism 10 is relatively low/

(A6) The differential portion 11 is operable as the continuously-variable transmission when the operating state of the first electric motor M1 is controlled, so that the vehicle drive toque produced by the differential portion 11 can be smoothly changed.

(A7) When the temperature of the first electric motor M1 is equal to or higher than the third threshold value $TEMP_3$ while the fluid temperature is lower than the second threshold value $TEMP_2$, the switching pattern is not changed to the switching pattern C defining the broadest differential region, but is changed to the switching pattern B. Alternatively, the switching pattern A is maintained in this case. Namely, the warm-up operation of the transmission mechanism 10 should not be positively promoted when the temperature of the first electric motor M1 is sufficiently high. The above-indicated arrangement not to select the switching pattern A or maintain the switching pattern A prevents an excessive rise of the temperature of the first electric motor M1 due to unnecessary promotion of the warm-up operation of the transmission mechanism 10. Although the temperature of the first electric motor M1 is compared with the third threshold value $TEMP_3$, the temperature of the second electric motor M2, or the average of the temperatures of the first and second electric motors M1, M2 may be compared with a threshold value which is suitably determined.

[Second Embodiment]

Referring next to FIGS. 11-15, a second embodiment of this invention will be described. In the following description of the second embodiment, the same reference signs as used in the first embodiment will be used to identify the same elements.

Figures 11, 12:
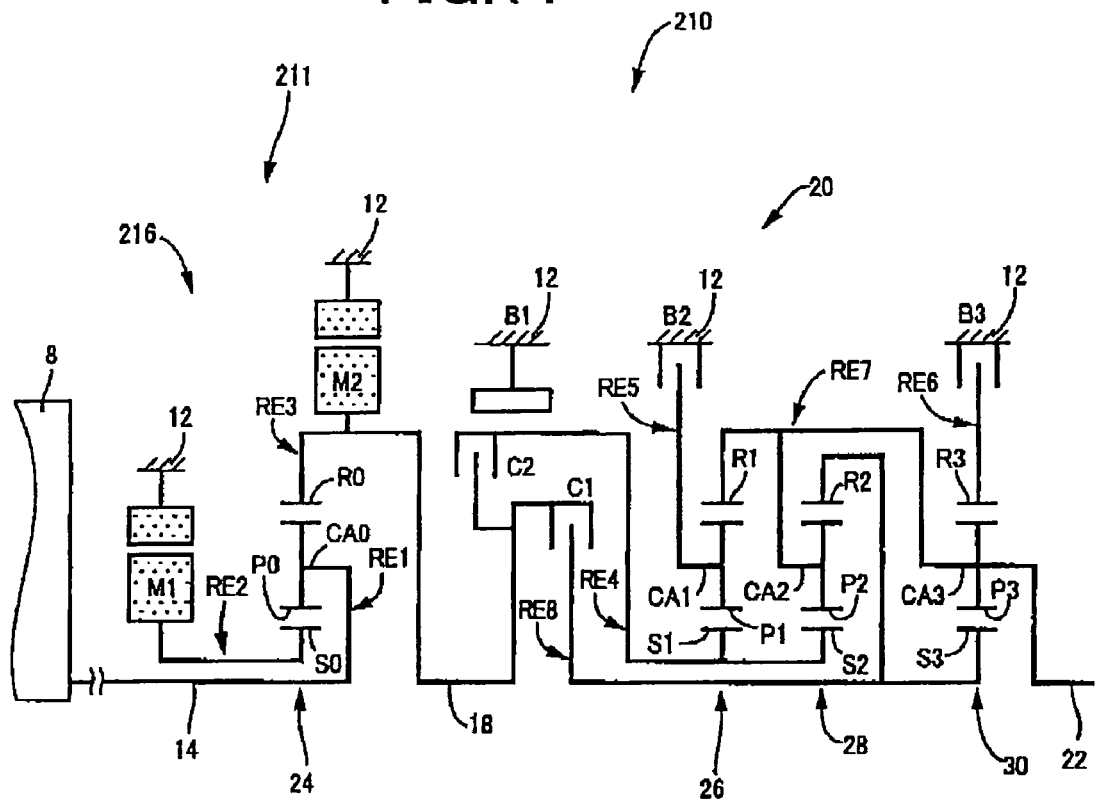
FIG. 11 is a schematic view corresponding to that of FIG. 1, showing an arrangement of another power transmitting system of a hybrid vehicle to which the present invention is applicable.
FIG. 12 is a table corresponding to that of FIG. 2, indicating shifting actions of the hybrid vehicle power transmitting system of FIG. 11, which is operable in a selected one of a continuously-variable shifting state and a step-variable shifting state, in relation to different combinations of operating states of hydraulically operated frictional coupling devices to effect the respective shifting actions.

A control apparatus according to the second embodiment is applicable to a transmission mechanism 210, which is different from the transmission mechanism 10 shown in FIG. 1. Referring to the schematic view of FIG. 11, there is shown an arrangement of the transmission mechanism 210 constituting a part of a power transmitting system for a hybrid vehicle, which power transmitting system is controlled by the control apparatus according to the present second embodiment. The transmission mechanism 210 of FIG. 11 is different from the transmission mechanism 10 of FIG. 1, primarily in that the transmission mechanism 210 is not provided with the switching clutch C0 and the switching brake B0. In FIG. 11, the transmission mechanism 210 includes: an input rotary member in the form of an input shaft 14; a differential portion 211 connected to the input shaft 14 either directly, or indirectly via a pulsation absorbing damper (vibration damping device) not shown; a step-variable or multiple-step transmission portion in the form of an automatic transmission portion 20 disposed between the differential portion 211 and drive wheels 38 (shown in FIG. 18) of the vehicle, and connected in series via a power transmitting member 18 (power transmitting shaft) to the differential portion 211 and the drive wheels 38; and an output rotary member in the form of an output shaft 22 connected to the automatic transmission portion 20. The input shaft 12, differential portion 211, automatic transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 210 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device (final speed reduction gear) 36 and a pair of drive axles, as shown in FIG. 18. The engine 8 may be a gasoline engine or diesel engine and functions as a vehicle drive power source directly connected to the input shaft 14 or indirectly via a pulsation absorbing damper.

In the present transmission mechanism 210, the engine 8 and the differential portion 211 are directly connected to each other. This direct connection means that the engine 8 and the transmission portion 211 are connected to each other, without a fluid-operated power transmitting device such as a torque converter or a fluid coupling being disposed therebetween, but may be connected to each other through the pulsation absorbing damper as described above. It is noted that a lower half of the transmission mechanism 210, which is constructed symmetrically with respect to its axis, is omitted in FIG. 1. This is also true to the other embodiments of the invention described below.

The differential portion 211 can be referred to as an electrically controlled differential portion, in a sense that the differential state of the differential portion 211 is changed by utilizing a first electric motor M1 (which will be described). This differential portion 211 provided with the first electric motor M1 is further provided with, a power distributing mechanism 216 functioning as a differential mechanism operable to mechanically distribute an output of the engine 8 received by the input shaft 14, to the first electric motor M1 and the power transmitting member 18; and a second electric motor M2 which is rotated with the output shaft 22. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 216 includes, as a major component, a planetary gear set 24 of a single pinion type having a gear ratio $\rho 0$ of about 0.418, for example. The planetary gear set 24 of the power distributing mechanism 216 has rotary elements consisting of: a sun gear S0, a planetary gear P0; a first carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio $\rho 0$ is represented by ZS0/ZR0.

In the power distributing mechanism 216, the carrier CA0 is connected to the input shaft 14, that is, to the engine 8, and the sun gear S0 is connected to the first electric motor M1, while the ring gear R0 is connected to the power transmitting member 18. The power distributing mechanism 216 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 216 (differential portion 211) is placed in the continuously-variable shifting state (electrically established CVT state), in which the rotating speed of the power transmitting member 18 is continuously variable, irrespective of the rotating speed of the engine 8. Namely, the power distributing mechanism 216 functions as an electrically controlled continuously variable transmission the speed ratio $\gamma 0$ of which (rotating speed of the input shaft 14/rotating speed of the power transmitting member 18) of the power distributing mechanism 216 is continuously changed from a minimum value $\gamma 0 min$ to a maximum value $\gamma 0 max$. Thus a differential state between the rotating speeds of the input shaft 14 and power transmitting member 18 is controlled by controlling the operating states of the f electric motor M1, second electric motor M2 and engine 8, which are operatively connected to the power distributing mechanism 216 (differential portion 211).

The automatic transmission portion 20 of the transmission mechanism 210 constitutes a part of a power transmitting path between the differential portion 211 and the drive wheels 38. This automatic transmission portion 20 is a planetary gear type multiple-step transmission functioning as a step-variable automatic transmission, which includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its a and about the axis of the first sun gear S1; and a first ring gear R1 meshing with the first sun gear S1 through the first planetary gear P1. For example, the first planetary gear set 26 has a gear ratio $\rho 1$ of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio $\rho 2$ of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio $\rho 3$ of about 0.421. Where the numbers of teeth of the first sun gear S1, first ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios $\rho 1$, $\rho 2$ and $\rho 3$ are represented by ZS1/ZR1, ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear 83 are integrally fixed to each other and selectively connected to the power transmitting member 18 through a first clutch C1.

Thus, the automatic transmission portion 20 and the differential portion 211 (power transmitting member 18) are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, a power transmitting path between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

Figure 16:
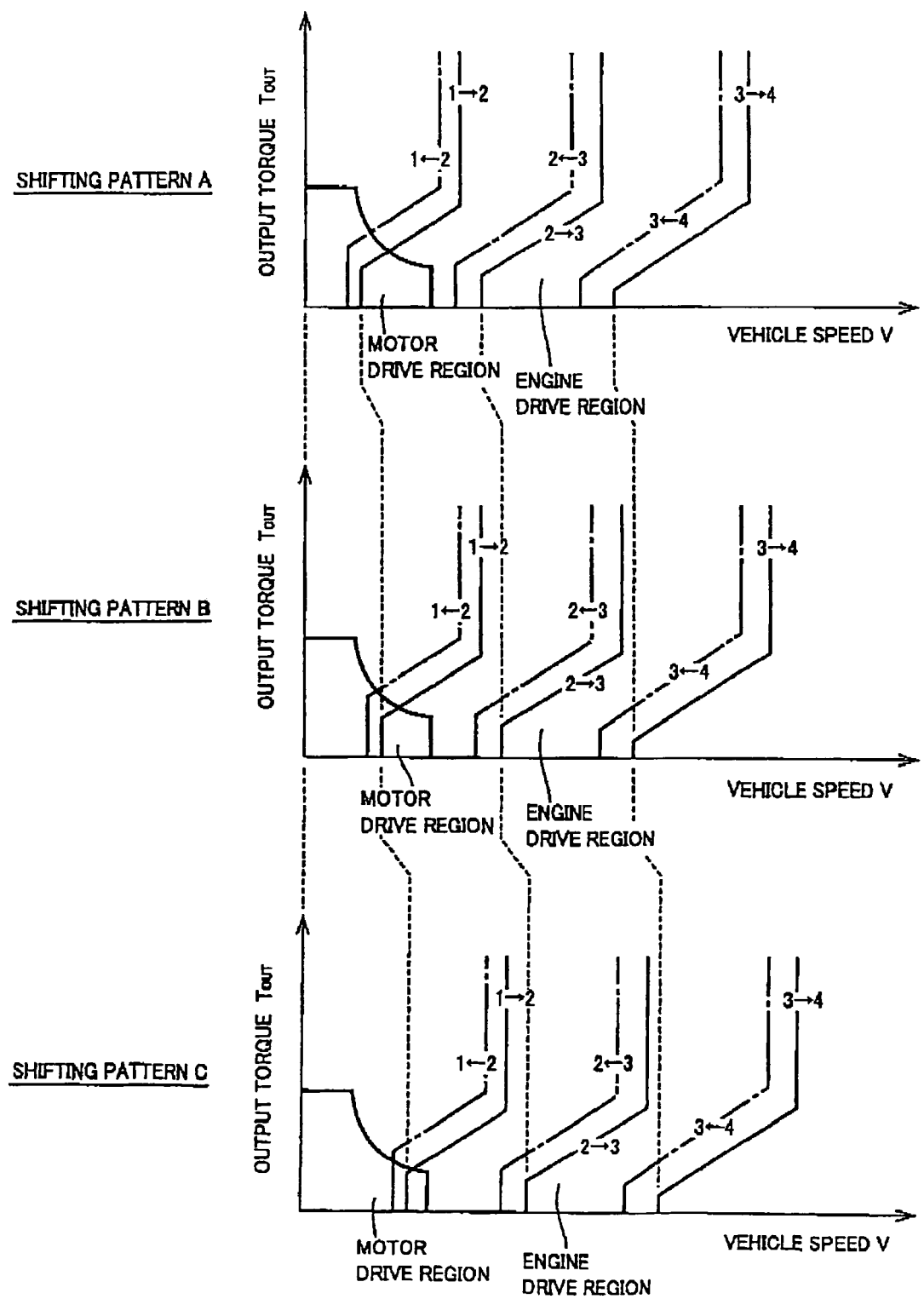
FIG. 16 is a view for explaining an operation of a shifting-condition changing portion shown in FIG. 14, to change the shifting boundary line map of FIG. 15, wherein a icing pattern A corresponds to the shifting pattern or shifting boundary line map of FIG. 15.

The automatic transmission portion 20 is placed in a selected one of a first gear position (first speed position) through a fourth gear position (fourth speed position), a reverse gear position (rear drive position) and a neural position, by concurrent engaging and releasing actions of corresponding combination of the two frictional coupling devices selected from the above-described clutches C1, C2 and brakes B1-B3, as indicated in the table of FIG. 16. The above-indicated positions have respective speed ratios $\gamma T$ (rotating speed $N_{18}$ of the power transmitting member 18/rotating speed $N_{OUT}$ of the output shaft 22) which change as geometric series. For example, the first gear position having the highest speed ratio $\gamma 1$ of about 3.357, for example, is established by engaging actions of the first clutch C1 and third brake B3, and the second gear position having the speed ratio $\gamma 2$ of about 2.180, for example, which is lower than the speed ratio γ1, is established by engaging actions of the first clutch C1 and second brake B2, as indicated in the table of FIG. 16. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing the first and second clutches C1, C2 and first, second and third brakes B1, B2, B3.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 210 constructed as described above, the differential portion 211 functioning as the continuously variable transmission and the automatic transmission portion 20 cooperate with each other to constitute a continuously-variable transmission. Further, the differential portion 211 the speed ratio of which is controlled to be held constant, and the automatic transmission portion 20 cooperate with each other to function substantially as a step-variable transmission.

Described in detail, when the differential portion 211 functions as the continuously-variable transmission while the automatic transmission portion 20 connected in series with the differential portion 211 functions as the step-variable transmission, the input shaft speed of the automatic transmission portion 20, that is, the rotating speed of the power transmitting member 18 (hereinafter referred to as "transmitting-member speed $N_{18}$") is continuously variable for a selected one of the first through fourth gear positions and the reverse gear position. Accordingly, the overall speed ratio γT (rotating speed $N_{IN}$ of the input shaft 14/rotating speed $N_{OUT}$ of the output shaft 22) of the transmission mechanism 210 is continuously variable, with the transmission mechanism 210 functioning as the continuously-variable transmission as a whole. The overall speed ratio γT of the transmission mechanism 210 is defined by the speed ratio γT0 of the differential portion 211 and the speed ratio γ of the automatic transmission portion 20.

Thus, the transmitting-member speed $N_{18}$ is continuously variable for the presently selected one of the first, second, third and fourth gear positions and reverse gear position indicated in the table of FIG. 16, so that the overall speed ratio γT of the transmission mechanism 210 is continuously variable between the speed ratios of the first gear position and the fourth gear position.

When the speed ratio of the differential portion 211 is controlled to be held constant, the overall speed ratio γT of the transmission mechanism 210 changes in steps as geometric series. by selectively establishing the first through fourth gear positions and reverse gear position by the engaging actions of the respective combinations of the two frictional coupling devices selected from the clutches C and brakes B.

When the speed ratio γ0 of the differential portion 211 is controlled to be held constant at "1", for example, the speed ratios (overall speed ratios γT) indicated in the table of FIG. 12 are obtained by shifting the automatic transmission portion 20 to the respective gear positions. When the speed ratio γ0 of the differential portion 211 is controlled to be held constant at a value lower than that of the fourth gear position, for example, at about 0.7, the overall speed ratios γT are made lower than the speed ratio of the fourth gear position, for example, about 0.7.

Figure 13:
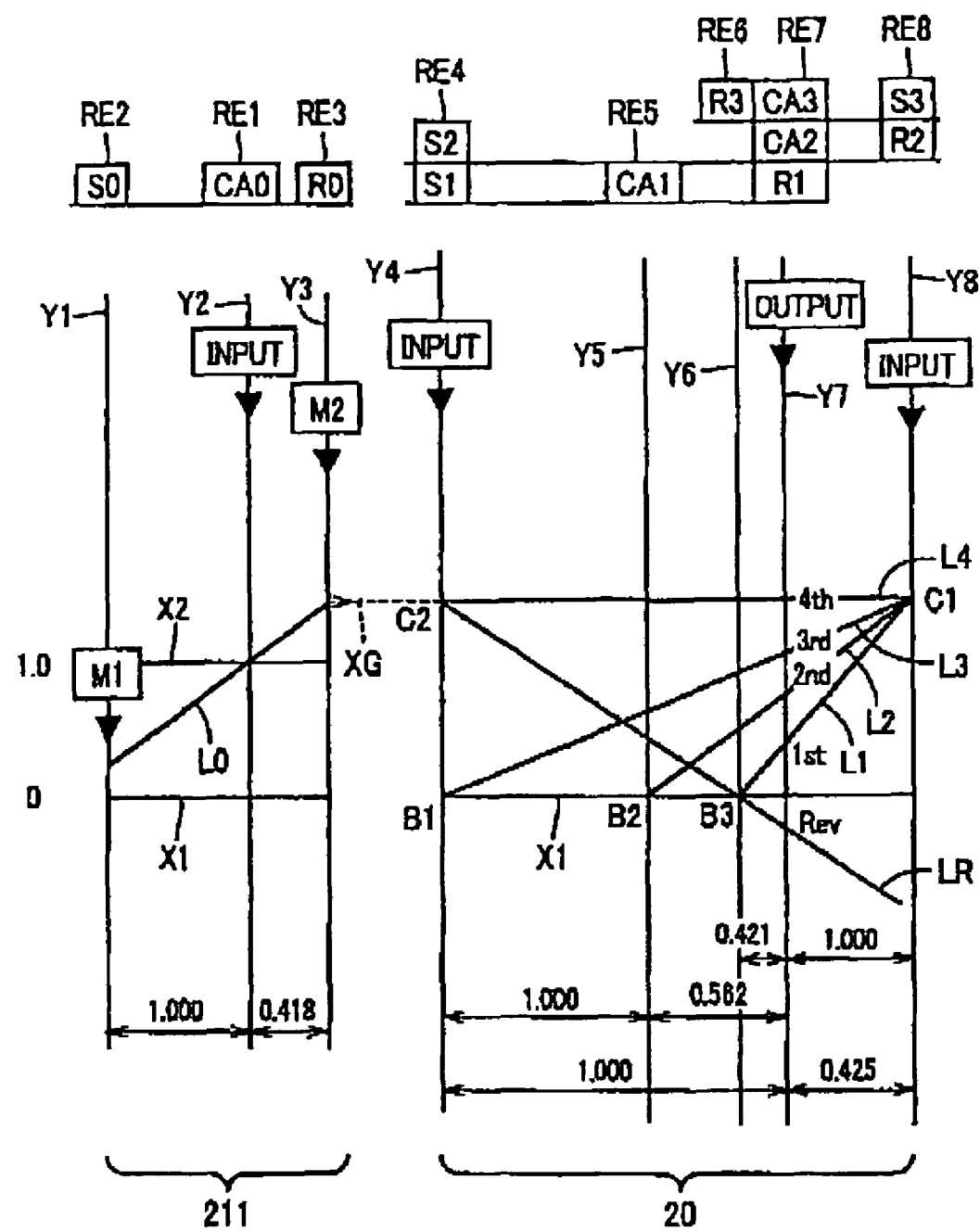
FIG. 13 is a collinear chart corresponding to that of FIG. 3, indicating relative rotating speeds of the hybrid vehicle power transmitting system of FIG. 11 operated in the step-variable shifting state, in different gear positions of the power transmitting system.
Figure 17:
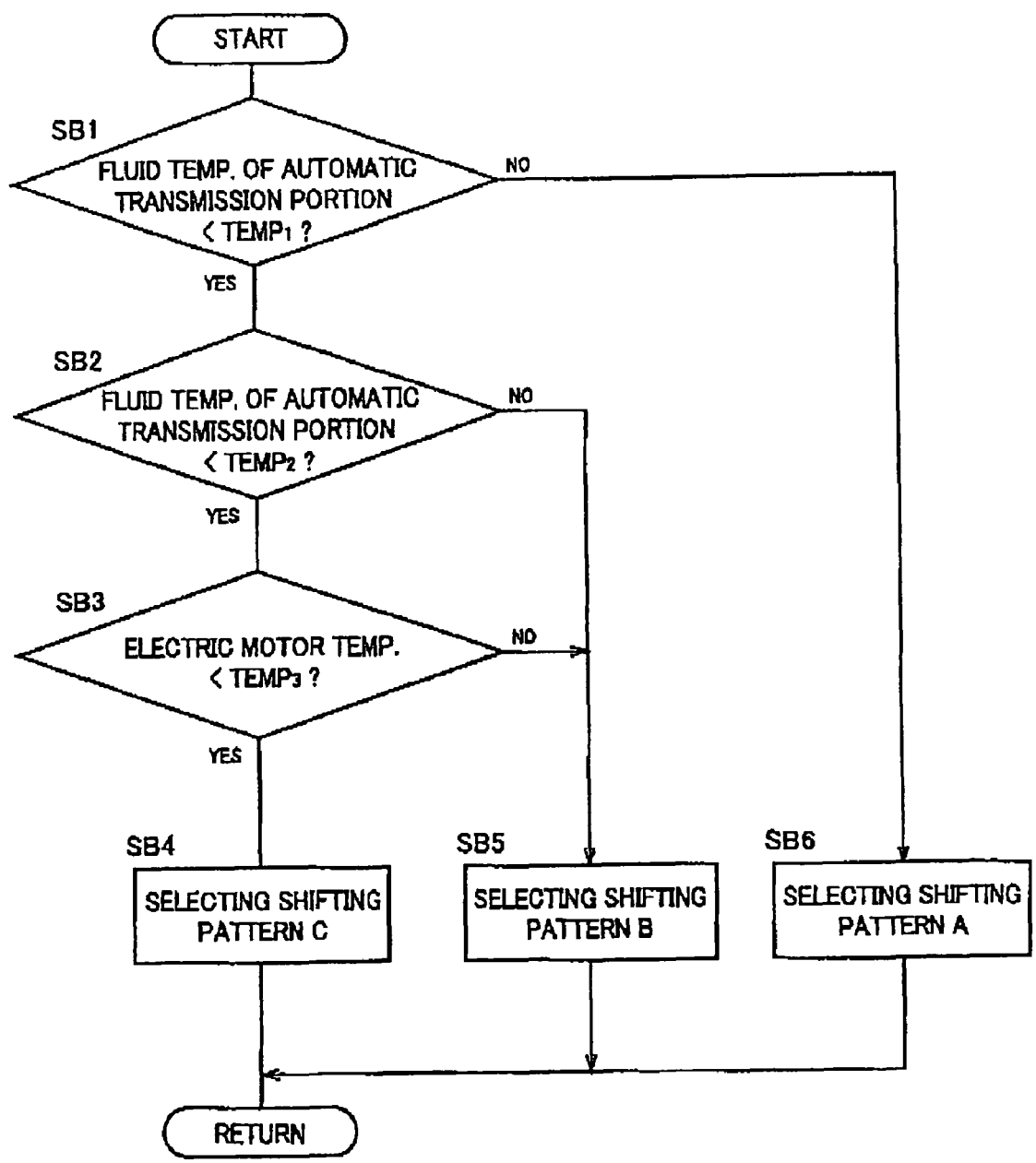
FIG. 17 is a flow chart illustrating a control routine executed by the electronic control device of FIG. 4 according to the second embodiment of the present invention.

The collinear chart of FIG. 13 indicates, by straight lines, a relationship among the rotating speeds of the rotary elements in each of the gear positions of the transmission mechanism 210, which is constituted by the differential portion 211 and the automatic transmission portion 20. The collinear chart of FIG. 17 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 216 of the differential portion 211 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE6 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear M3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, corresponds to "1", while the distance between the carrier and ring gear of each planetary gear set 26, 28, 30 corresponds to the gear ratio ρ.

Referring to the collinear chart of FIG. 13, the power distributing mechanism 216 (differential portion 211) of the transmission mechanism 210 is arranged such that the first rotary element R131 (first carrier CA0) of the first planetary gear set 24 is integrally fixed to the input shaft 14 (engine 8), and the second rotary element RE2 is fixed to the first electric motor M1, while the third rotary element RE3 (first ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the rotating speed of the ring gear R0 represented by a point of intersection between the straight lines L0 and Y3 is determined by the vehicle running speed V and is held substantially constant, for example, in the differential state of the differential portion 211 in which the first, second and third rotary elements RE1-RE3 are rotatable relative to each other, the rotating speed of the first sun gear S0 represented by the straight line L0 and vertical line Y1, namely, the speed of the first electric motor M1 is raised or lowered by controlling the engine speed $N_E$ to raise or lower the rotating speed of the first carrier CA0 represented by the straight line L4 and vertical line Y2.

When the operating speed of the first electric motor M1 is controlled to hold the speed ratio γ0 of the differential portion 211 at "1" so that the rotating speed of the first sun gear S0 is made equal to the engine speed $N_E$, the straight line L0 and the horizontal line X2 are aligned with each other, the first ring gear R0 and the power transmitting member 18 are rotated at a speed corresponding to the engine speed $N_E$. When the operating speed of the first electric motor M1 is controlled to hold the speed ratio γ0 of the differential portion 211 at a value lower than "1", for example, at 0.7, so that the rotating speed of the first sun gear S0 is zeroed, on the other hand, the transmitting-member speed $N_{18}$ is made higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 is engaged to transmit a rotary motion of the output rotary member in the form of the power transmitting member 18 (third rotary element RE3) of the differential portion 211 to the eighth rotary element RE8, the automatic transmission portion 20 is placed in the first gear position by the engaging the third brake B3 as well as the first clutch C1. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 17. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 14:
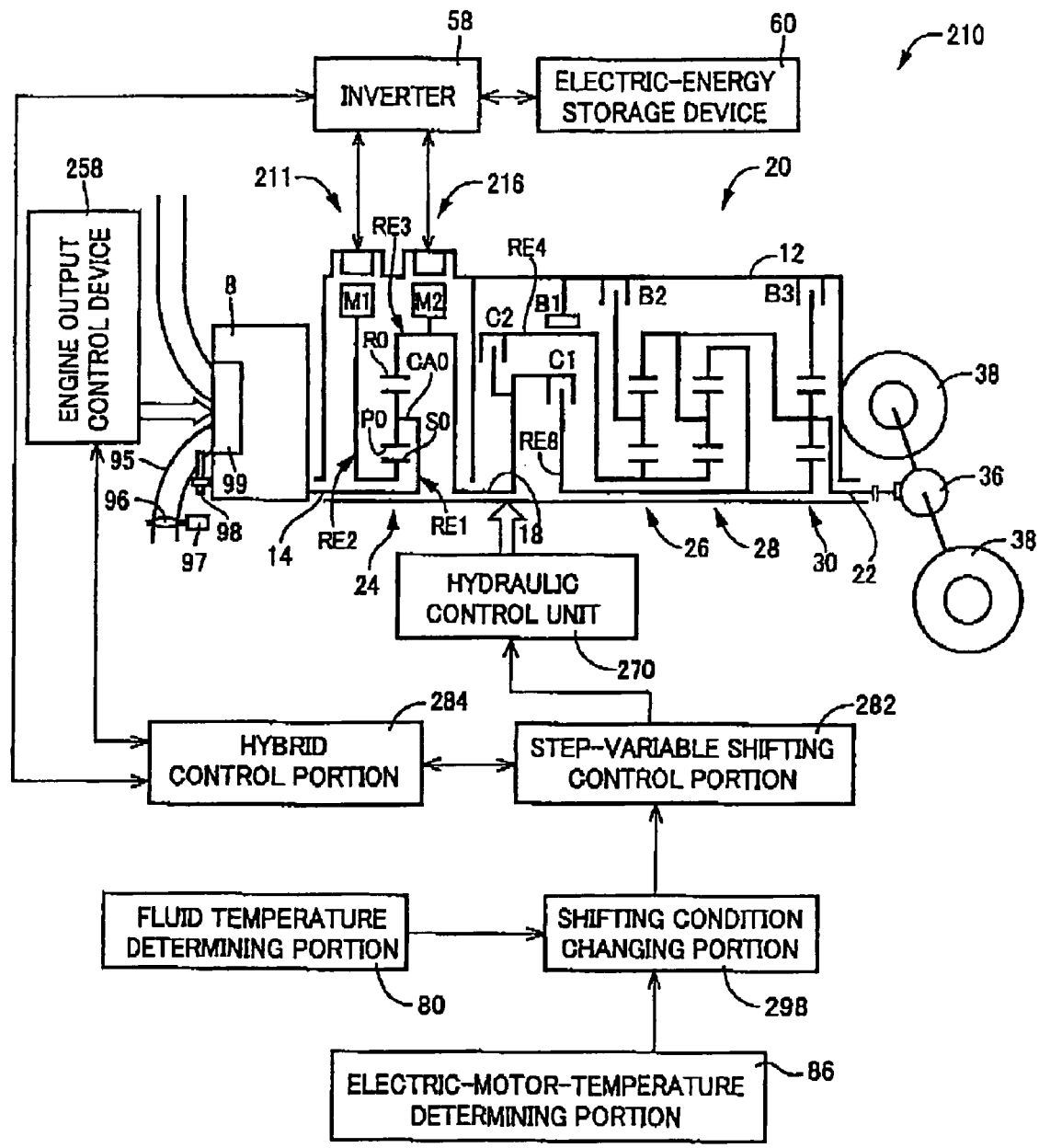
FIG. 14 is a functional block diagram corresponding to that of FIG. 6, illustrating major control functions of an engine starting control apparatus in the form of an electronic control device constructed according to another embodiment of this invention.

FIG. 14 is a functional block diagram for explaining major control functions of an electronic control device 280 which functions as the control apparatus and which includes a step-variable shifting control portion 282, a hybrid control portion 284, and a shifting condition changing portion 298. The step-variable shifting control portion 282 is arranged to determine whether a shifting action of the automatic transmission portion 20 should take place, that is, to determine the gear position to which the automatic transmission portion 20 should be shifted. This determination is made on the basis of a condition of the hybrid vehicle as represented by the vehicle speed V and au output torque $T_{OUT}$ of the automatic transmission portion 20, and according to a shifting boundary line map (shifting control map or relation) stored in a memory and which represents shift-up boundary lines indicated by solid lines in FIG. 15 and shift-down boundary lines indicated by one-dot chain lines in FIG. 15. The step-variable shifting control portion 282 implements an automatic shifting control of the automatic transmission portion 20, to establish the determined gear position. It is noted that the shift-up boundary lines and shift-down boundary lines are not limited to those indicated in FIG. 15, but may be suitably determined while tag account of the fuel economy and drivability of the hybrid vehicle. Further, the parameters used to define the shifting boundary lines are not limited to the vehicle speed V and output torque $T_{OUT}$.

Described in detail, the step-variable shifting control portion 292 generates commands (shifting commands or hydraulic control command) to be applied to a hydraulic control unit 270, to selectively engage and release the respective two hydraulically operated frictional coupling devices, for establishing the determined gear position of the automatic transmission portion 20 according to the table of FIG. 16. That is, the step-variable shifting control portion 282 commands the hydraulic control unit 270 to activate the appropriate hydraulic actuators to concurrently engage one of the two frictional coupling device and release the other frictional coupling device, to effect the clutch-to-dutch shifting actions of the automatic transmission portion 20.

The hybrid control portion 284 is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 211 operating as the electrically controlled continuously variable transmission. For instance, the hybrid control portion 284 calculates a target (required) vehicle output at the present running speed V of the vehicle, on the basis of the operating amount $A_{CC}$ of an accelerator pedal used as an operator's required vehicle output and the vehicle running speed V, and calculate a target total vehicle output on the basis of the calculated target vehicle output and a required amount of generation of an electric energy by the first electric motor M1. The hybrid control portion 284 calculates a target output of the engine 8 to obtain the calculated target total vehicle output, while taking account of a power transmission loss, a load acting on various devices of the vehicle, an assisting torque generated by the second electric motor M2, etc. The hybrid control portion 284 controls the speed $N_E$ and torque $T_E$ of the engine 8, so as to obtain the calculated target engine output, and the amount of generation of the electric energy by the first electric motor M1.

The hybrid control portion 284 is arranged to implement the hybrid control while taking account of the presently selected gear position of the automatic transmission portion 20, so as to improve the drivability of the vehicle and the fuel economy of the engine 8. In the hybrid control, the differential portion 211 is controlled to function as the electrically controlled continuously-variable transmission, for optimum coordination of the engine speed $N_E$ and for efficient operation of the engine 8, and the rotating speed of the power transmitting member 18 determined by the vehicle speed V and the selected gear position of the transmission portion 20. That is, the hybrid control portion 284 determines a target value of the overall speed ratio γT of the transmission mechanism 210, so that the engine 8 is operated according to a stored highest-fuel-economy curve (fuel-economy map or relation) stored in memory means. The target value of the overall speed ratio γT of the transmission mechanism 210 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 284 controls the speed ratio γ0 of the differential portion 211, so as to obtain the target value of the overall speed ratio γT, so that the overall speed ratio γT can be controlled within a predetermined range.

In the hybrid control, the hybrid control portion 284 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the power transmitting system is provided with an electric path through which an electric energy generated by conversion of a portion of a drive force of the engine 8 is converted into a mechanical energy.

The hybrid control portion 284 is further arranged to hold the engine speed $N_E$ at a substantially constant value or control the engine speed NE to a desired value owing to the electric CVT function of the differential portion 311, by controlling the first electric motor speed $N_{M1}$ and/or second electric motor speed $N_{M2}$, irrespective of whether the vehicle is stationary or running. In other words, the hybrid control portion 284 is capable of controlling the first electric motor speed $N_{M1}$ and/or second electric motor speed $N_{M2}$, while holding the engine speed $N_E$ at a substantially constant value or controlling the engine speed $N_E$ to a desired value.

For example, the hybrid control portion 284 is arranged to raise the engine speed $N_E$ during running of the vehicle, by raising the first electric motor speed $N_{M1}$ while the second electric motor speed $N_{M2}$ determined by the vehicle speed V (rotating speed of the drive wheels 38) is held substantially constant, as is apparent from the collinear chart of FIG. 13. The hybrid control portion 284 holds the engine speed $N_E$ substantially constant during a shifting action of the automatic transmission portion 20, by changing the first electric motor speed $N_{M1}$ in a direction opposite to the direction of change of the second electric motor speed $N_{M2}$ as a result of the shifting action of the automatic transmission portion 20, while the engine speed $N_E$ is held substantially constant.

The hybrid control portion 284 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination.

For instance, the hybrid control portion 284 is basically arranged to control the throttle actuator 97 on the basis of the operation amount $A_{CC}$ of the accelerator pedal and according to a predetermined stored relationship (not shown) between the operation amount $A_{CC}$ of the accelerator pedal and the opening angle $\theta_{TH}$ of the electronic throttle valve 96 such that the opening angle $\theta_{TH}$ increases with an increase of the operation amount $A_{CC}$. According to control commands received from the hybrid control portion 284, the engine output control device 258 controls the throttle actuator 97 to open and close the electronic throttle valve 96, controls the fuel injecting device 98 to control the fuel injection into the engine 8, and controls the ignition device (igniter) 99 to control the ignition timing of the engine 8, for thereby controlling the torque of the engine 8.

The hybrid control portion 284 is capable of establishing a motor drive mode to drive the vehicle by the electric motor, by utilizing the electric CVT function (differential function) of the differential portion 211, irrespective of whether the engine 8 is in the non-operated state or in the idling state. Generally, the hybrid control portion 284 establishes the motor drive mode when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. For reducing a dragging of the engine 8 in its non-operated state and improving the fuel economy in the motor-drive mode, the hybrid control portion 284 is configured to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed $N_{M1}$ is controlled to be in a non-load state, so as to be freely rotated to have a negative speed $N_{M1}$.

The hybrid control portion 284 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 38.

The hybrid control portion 284 is further configured to place the first electric motor M1 in a non-load state in which the first electric motor M1 is freely rotated, so that the differential portion 211 is placed in a state similar to the power cut-off state in which power cannot be transmitted through the power transmitting path within the differential portion 211, and no output can be generated from the differential portion 211. Namely, the hybrid control portion 284 is arranged to place the first electric motor M1 in the non-load state, for thereby placing the differential portion 211 in a neutral state in which the power transmitting path is electrically cut off.

The hybrid control portion 284 is further configured to control the second electric motor M2 such that the second electric motor M2 is operated as the electric generator by a kinetic energy of the running hybrid vehicle during coasting of the hybrid vehicle with the accelerator pedal held in its non-operated position, or during brake application to the hybrid vehicle. In this case, the kinetic energy by which the second electric motor M2 is driven is transmitted in the direction from the drive wheels 34 toward the engine 8. Thus, the hybrid control portion 284 functions as regeneration control means for charging the electric-energy storage device 60 with the electric energy which is generated by the second electric motor M2 and which is supplied through the inverter 58. According to a regeneration control by the regeneration control means, the amount of electric energy generated by the second electric motor M2 operating as the electric generator is controlled on the basis of the amount of electric energy SOS stored in the electric-energy storage device 56, and a braking force generated by a hydraulic braking system of the vehicle according to an amount of operation of a brake pedal.

There will be described a control operation to expedite the warm-up operation of the transmission mechanism 210, for improving the fuel economy of the hybrid vehicle. The electronic control device 280 used in the second embodiment also includes the fluid temperature determining portion 80 and electric-motor-temperature determining portion 86 used in the first embodiment.

Referring to FIG. 16, there are shown three shifting patterns A, B and C. The shifting pattern A shown in FIG. 16 is the sane as the shifting pattern represented by the shifting boundary line map of FIG. 15. The switching patterns A, B and C are stored in the electronic control device 380. The shifting pattern A is used when the transmission mechanism 210 is placed in the fully warmed-up state, and is changed to the switching pattern B or C by the shifting condition changing portion 298, as described below. Namely, the shifting condition changing portion 298 maintains the shifting pattern A in the fully warmed-up state of the transmission mechanism 210, so that the automatic transmission 20 is automatically shifted up and down according to the shifting pattern A, in the fully warmed-up state of the transmission mechanism 211. Described in detail, the automatic transmission 20 is shifted down when the point defined by the vehicle condition as represented by the vehicle speed V and the required output torque $T_{OUT}$ of the automatic transmission 20 has moved across any shift-down boundary line of FIG. 15, and is shifted up when the point has moved across any shift-up boundary line of FIG. 15. When the point defined by the vehicle speed V and the required output toque Tow has moved from a point "e" to a point "f", for example, the point defined by the vehicle condition has moved across the 3-2 shift-down boundary line $L_{DN}$ for shifting down the automatic transmission portion 20 from the third gear position to the second gear position. In this case, therefore, the automatic transmission portion 20 is automatically shifted down from the third gear position to the second gear position, on the basis of the detected vehicle speed V and required output $T_{OUT}$ and according to the switching pattern A. When the point defined by the vehicle speed V and the required output toque $T_{OUT}$ has moved from a point "g" to a point "h", for example, the point defined by the vehicle condition has moved across the 3-4 shift-up boundary line $L_{UP}$ for shifting up the automatic transmission portion 20 from the third gear position to the fourth gear position. In this case, therefore, the automatic transmission portion 20 is automatically shifted up from the third gear position to the fourth gear position according to the switching pattern A.

Figure 15:
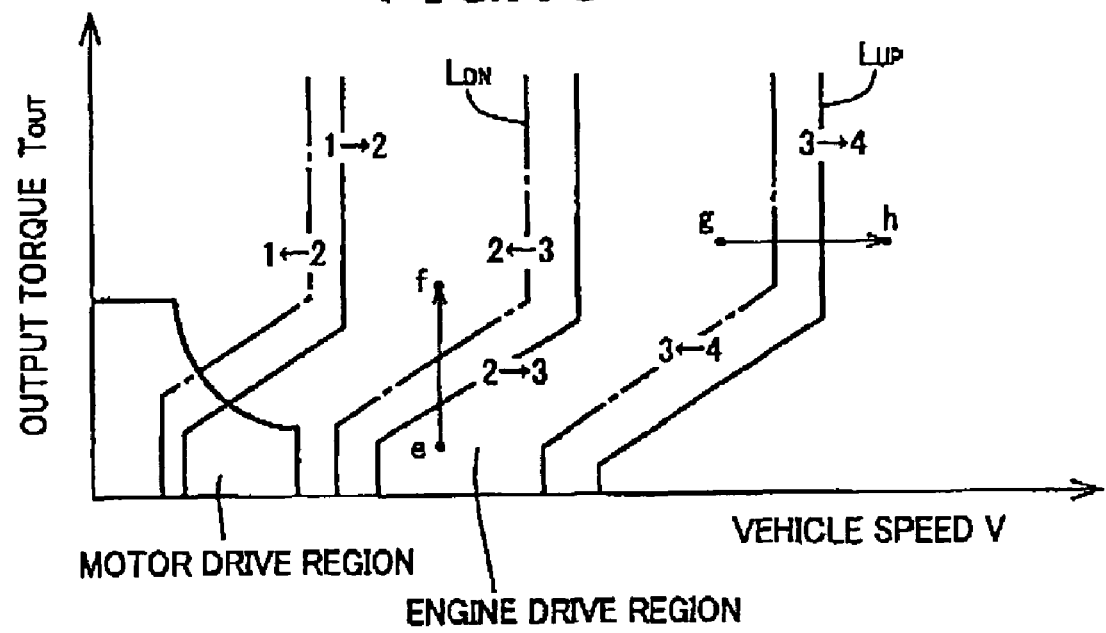
FIG. 15 is a view corresponding to that of FIG. 7, illustrating an example of a stored shifting pattern or shifting boundary line map used for determining a shifting action of an automatic transmission portion, and an example of a stored drive-power-source switching boundary line map defining a boundary line between an engine drive region and a motor drive region for switching between an engine drive mode and a motor drive mode, in the same two-dimensional coordinate system defined by control parameters in the form of a running speed and an output torque of the vehicle, such that those maps are related to each other.

Referring back to FIG. 14, the shifting condition changing portion 298 is configured to select the shifting pattern A when the temperature determining portion 80 determines that the temperature of the transmission portion 210 is equal to or higher than the first threshold value $TEMP_1$. Namely, the shifting boundary line map of FIG. 15 is maintained in the fully warmed-up state of the transmission mechanism 210. The shifting pattern A is determined to maximize the fuel economy of the hybrid vehicle, while taking account of the control of the speed ratio γ0 of the differential portion 211 in the fully warmed-up state.

When the fluid temperature determining portion 80 determines that the temperature of the transmission mechanism 210 is lower than the first threshold value $TEMP_1$ but is equal to or higher than the second threshold value $TEMP_2$, the shifting condition changing portion 298 changes the shifting pattern from the shifting pattern A to the shifting pattern B. As is apparent from FIG. 16, the shift-up boundary lines (indicated by solid lines) and shift-down boundary lines (indicated by one-dot chain lines) according to the shifting pattern B are shifted with respect to those according to the shifting pattern A, in the direction of increase of the vehicle speed V.

When the fluid temperature determining portion 80 determines that the temperature of the transmission mechanism 210 is lower than the second threshold value $TEMP_3$ and when the electric-motor-temperature determining portion 86 determines that the temperature of the first electric motor M1 is lower than the third threshold value $TEMP_3$, the shifting condition changing portion 198 changes the shifting pattern from the shifting pattern A to the shifting pattern C. As is apparent from FIG. 16, the shift-up boundary lines (indicated by solid lines) and shift-down boundary lines (indicated by one-dot chain lines) according to the shifting pattern C are shifted with respect to those according to the shifting pattern B, in the direction of increase of the vehicle speed V.

When the fluid temperature determining portion 80 determines that the temperature of the transmission mechanism 210 is lower than the second threshold value $TEMP_2$ while but the electric-motor-temperature determining portion 86 determines that the temperature of the first electric motor M1 is equal to or higher than the third threshold value $TEMP_3$, the shifting condition changing portion 198 selects the shifting pattern B. However, the shifting condition changing portion 298 may select the shifting pattern A, when the electric-motor-temperature determining portion 86 determines that the temperature of the first electric motor M3 is equal to or higher than the third threshold value $TEMP_3$ (when the first electric motor M1 has a sufficiently high temperature), irrespective of the determination of the fluid temperature determining portion 80. Namely, the shifting condition changing portion 298 may maintain the pattern A (for shifting up and down the automatic transmission portion 20 at lower vehicle speeds than when the shifting pattern B or C is selected), when the temperature of the first electric motor M1 is sufficiently high.

The flow chart of FIG. 17 illustrates a control routine executed by the electronic control device 280 to promote the warm-up operation of the transmission mechanism 210, according to the second embodiment of this invention. The control routine is repeatedly executed with an extremely short cycle time of several milliseconds to several tens of milliseconds. Steps SB1 through SB3 in the control routine of FIG. 17 are identical with steps SA1 through SA3 in the control routine of FIG. 10 according to the first embodiment.

When the affirmative determinations are obtained in steps SB1, SB2 and SB3, the control flow goes to step SB4 to select the shifting pattern C of FIG. 16, that is, to change the shifting pattern A to the shifting pattern C.

When the negative determination is obtained in step SB2 or SB3 while the affirmative determination is obtained in step SB1, the control flow goes to step SB5 to select the shifting pattern B, namely, to change the shining pattern A to the shifting pattern B.

When the negative determination is obtained in step SB1, the control flow goes to step SB6 to select the shifting pattern A, that is, to maintain the shifting pattern A (shifting boundary line map of FIG. 15). It will be understood that steps SB4 through SB6 correspond to the shifting condition changing portion 298 configured to change the shifting condition for shifting the automatic transmission portion 20, when the temperature of the transmission mechanism 210 is lower than a predetermined threshold value.

The control apparatus in the form of the electronic control device 280 according to the second embodiment has the following advantages (B1)-(B5) in addition to the advantage (A6) described above with respect to the first embodiment.

(B1) The shift-up boundary lines and the shift-down boundary lines are shifted in the direction of increase of the vehicle speed V when the temperature of the transmission mechanism 210 is lower than the first threshold value $TEMP_1$, so that the second electric motor M2 is permitted to be operated at a higher speed, whereby the amount of heat generated by the first and second electric motors M1, M2 is increased, with a result of rapidly raising the temperature $TEMP_{ATF}$ of the working fluid which is used to cool the first and second electric motors M1, M2. Accordingly, the warm-up operation of the transmission mechanism 210 can be expedited or promoted, so that the fuel economy of the vehicle is improved.

(B2) The shifting pattern A of FIG. 16 which corresponds to the shifting boundary line map of FIG. 15 is used in the fully warmed-up state of the transmission mechanism 210, and is changed to the shifting pattern B or C when the temperature of the transmission mechanism 210 is lower than the first threshold value $TEMP_1$. The shifting pattern A is determined to maximize the fuel economy of the hybrid vehicle, while taking account of the control of the speed ratio γ0 of the differential portion 211 in the fully warmed-up state of the transmission mechanism 210. Accordingly, the shifting pattern A is used to perform the shifting actions of the automatic transmission portion 20, after the transmission mechanism 210 has been fully warmed up, so that the fuel economy of the hybrid vehicle is improved.

(B3) The second threshold value $TEMP_2$ is lower than the first threshold value $TEMP_1$ above which the shifting pattern A (shifting boundary line map of FIG. 15) is maintained, and the shifting pattern B or C is selected depending upon whether the temperature of the transmission mechanism 210 is lower than the second threshold value $TEMP_2$ or not. The shift-up boundary lines and shift-down boundary lines according to the shifting pattern B are shifted with respect to those according to the shifting pattern A, in the direction of increase of the vehicle speed V, and the shift-up and shift-down boundary lines according to the shifting pattern C are shifted with respect to those according to the shifting pattern B, in the direction of increase of the vehicle speed V. In other words, the shift-up and shift-down boundary lines are shifted in the direction of increase of the vehicle speed V, with a decrease of the temperature of the transmission mechanism 210. This shifting of the shift-up and shift-down boundary lines permits the second electric motor M2 to be operated at a higher speed, making it possible to increase the amount of heat generated by the first and second electric motors M1, M2, so that the warm-up operation of the transmission mechanism 210 is promoted by the operation of the first electric motor M1, with a decrease of the temperature of the transmission mechanism 210.

(B4) The temperature of the transmission mechanism 210 can be easily determined by the temperature $TEMP_{ATF}$ of the working fluid detected by the temperature sensor. The shifting pattern is changed so as to shift the shift-up and shift-down boundary lines in the direction of increase of the vehicle speed V with a decrease of the fluid temperature $TEMP_{ATF}$. The fluid temperature $TEMP_{ATF}$ is rapidly raised by an increase of the amount of heat generated by the first and second electric motors M1, M2, making it possible to rapidly warm up the components cooled or lubricated by the working fluid of the automatic transmission portion 20, such as the first electric motor M1, second electric motor M2, planetary gear set 24 of the differential portion 21, and first through third planetary gear sets 26, 28 and 30 of the automatic transmission portion 20.

(B5) When the temperature of the first electric motor M1 is equal to or higher than the third threshold value $TEMP_8$ while the fluid temperature is lower than the second threshold value $TEMP_2$, the shifting pattern is not changed to the shifting pattern C (for shifting the automatic transmission portion 20 at a lower speed than according to the shifting patterns A and B), but is changed to the shifting pattern B. Alternatively, the shifting pattern A is maintained in this case. Namely, the warm-up operation of the transmission mechanism 210 should not be positively promoted when the temperature of the first electric motor M1 is Efficiently high. The above-indicated arrangement not to select the shifting pattern A or maintain the shifting pattern A prevents an excessive rise of the temperature of the first electric motor M1 due to unnecessary promotion of the warm-up operation of the transmission mechanism 210. Although the temperature of the first electric motor M1 is compared with the third threshold value $TEMP_3$, the temperature of the second electric motor M2, or the average of the temperatures of the first and second electric motors M1, M2 may be compared with a threshold value which is suitably determined. When the temperature of the second electric motor M2 is compared with the third threshold value $TEMP_3$, it is possible to prevent an excessive rise of the temperature of the second electric motor M1.

While the preferred embodiments of this invention have been described in detail by reference to the accompanying drawings, for illustrative purpose only, it is to be understood that the present invention may be embodied with various changes and modifications which may occur to those skilled in the art.

The first, second and third threshold values $TEMP_1$, $TEMP_2$ and $TEMP_3$ used in the first embodiment may be identical with or different from those used in the second embodiment.

The switching patterns or switching boundary lines (line maps) defining the continuously-variable and step-variable shifting regions (differential and non-differential regions) used in the first embodiment are not limited to those shown in FIGS. 8 and 9. While the switching patterns of FIGS. 8 and 9 are defined in the two-dimensional coordinate system having the two axes along which the engine speed $N_E$ and engine torque $T_E$ are respectively taken, these two parameters may be replaced by any other parameter or parameters. For instance, only the operating amount $A_{CC}$ of the accelerator pedal or the engine speed $N_E$ may be used to define the continuously-variable and step-variable shifting region, or three or more parameters may be used to define these two shifting regions.

In the illustrated first and second embodiments, the temperature of the transmission mechanism 10, 210 is determined by detecting the temperature $TEMP_{ATF}$ of the working fluid of the automatic transmission portion 20. However, the temperature of the transmission mechanism 10, 210 may be determined by an average of temperatures at a plurality of positions of the casing 12 that are detected by respective sensors.

In the second embodiment, the shift-up boundary lines and shift-own boundary lines are moved or shifted in the direction of increase of the vehicle speed V with a decrease of the temperature of the transmission mechanism 10, 210. However, the shift-up and shift-down boundary lines may be shifted in the direction of increase of the output torque $T_{OUT}$. Further, the output torque $T_{OUT}$ taken along the vertical axis of the two-dimensional coordinate system of FIG. 15 may be replaced by the operating amount $A_{CC}$ of the accelerator pedal. In this case, the shift-p and shift-down boundary lines may be shifted in the direction of increase of the operation amount $A_{CC}$.

The illustrated transmission mechanism 10, 210 may be arranged such that the differential gear device 36 is lubricated by the working fluid of the automatic transmission portion 20. In this case, the warm-up operation of the differential gear device 36 can also be promoted according to the control routine of FIG. 10 or 17.

In the illustrated transmission mechanism 10, 210, the differential portion 11, 211 (power distributing mechanism 16, 216) is operable as an electrically controlled continuously-variable transmission the speed ratio γ0 of which is variable from the minimum value γ0min to the maximum value γ0max. However, the speed ratio γ0 of the differential portion 11, 211 may be variable in steps by utilizing its differential function.

While the engine 8 and the differential portion 11, 211 are connected directly to each other in the illustrated transmission mechanism 10, 210, the engine 8 and the differential portion 11, 211 may be connected to each other through a clutch or any other coupling device.

In the illustrated transmission mechanism 10, 210, the first electric motor M1 and the second rotary element RE2 are connected directly to each other while the second electric motor M2 and the third rotary element RE3 are connected directly to each other. However, the first electric motor M1 and the second rotary element RE2 may be connected to each other through a clutch or any other coupling device, and the second electric motor M2 and the third rotary element RE3 way be connected to each other through a clutch or any other coupling device.

In the illustrated transmission mechanism 10, 210, the automatic transmission portion 20 is disposed between the differential portion 11, 211 and the drive wheels 88, the automatic transmission portion 20 may be disposed between the engine 8 and the differential portion 11, 211. The automatic transmission portion 20 is required to constitute a part of the power transmitting path between the engine and the drive wheels 38.

In the illustrated transmission mechanism 10, 210 shown in FIGS. 1 and 11, the differential portion 11, 211 and the automatic transmission portion 20 are connected in series with each other. However, the present invention is applicable to a vehicular power transmitting system in which the differential portion 11, 211 and the automatic transmission portion 20 are not mechanically independent of each other, provided the transmission mechanism 10, 210 as a whole has an electrically controlled differential function, and a function of changing its overall speed ratio in a manner other than the electrically controlled differential function.

While the power distributing mechanism 16, 216 in the illustrated transmission mechanism 10, 210 is constituted by the single-pinion type planetary gear set 24, the power distributing mechanism 16 may be constituted by a double-pinion type planetary gear set.

In the illustrated transmission mechanism 10, 210, the engine 8 is operatively connected to the first rotary element RE1 of the planetary gear set 24 of the differential portion 11, 211 and the first electric motor M1 is operatively connected to the second rotary element RE2, while the drive wheels 38 are operatively connected to the third rotary element RE3. However, the engine 8, first electric motor M1 and drive wheels 38 may be operatively connected to selected ones of rotary elements of two planetary gear sets that are connected to each other, so that the differential portion 11, 211 is switched between its step-variable and continuously-variable shifting states by selectively engaging switching clutch and brake connected to selected one of the rotary elements.

The automatic transmission portion 20 which is a transmission portion functioning as a step-variable automatic transmission may be replaced by a continuously-variable transmission (CVT).

In the first and second illustrated embodiments, the second electric motor M2 is directly connected to the power transmitting member 18. However, the second electric motor M2 may be connected, either directly or indirectly via a transmission, a planetary gear set or coupling device to any portion of the power transmitting path between the engine 8 or power transmitting member 18 and the drive wheels 38.

In the power distributing mechanism 16, 216 in the illustrated first and second embodiments, the first carrier CA0 is fixed to the engine 8, and the first sun gear S0 is fixed to the first electric motor M1 while the first ring gear R0 is fixed to the power distributing member 18. However, this arrangement is not essential. The engine 8, first electric motor M1 and power transmitting member 18 may be fixed to any other elements selected from the three elements CA0, S0 and R0 of the first planetary gear set 24.

While the engine 8 is directly fixed to the input shaft 14 in the illustrated first and second embodiments, the engine 8 may be operatively connected to the input shaft 14 through any suitable member such as gears and a belt, and need not be disposed coaxially with the input shaft 14.

In the illustrated first and second embodiments, the first and second electric motors M1, M2 are disposed coaxially with the input shaft 14 such that the first electric motor M1 is connected to the first sun gear S0 while the second electric motor M2 is connected to the power transmitting member 18.

However, this arrangement is not essential. For instance, the first electric motor M1 may be operatively connected to the first sun gear S0 through gears, a belt or a speed reduction device, while the second electric motor M2 may be connected to the power transmitting member 18.

While the power distributing mechanism 16m 216 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

In the illustrated transmission mechanism 10, 210, the second electric motor M2 is connected to the power transmitting member 18 which constitutes a part of the power transmitting path between the engine 8 and the drive wheels 38. The transmission mechanism 10 may be modified such that the second electric motor M2 connected to the power transmitting path is connectable to the power distributing mechanism 16 through a clutch or any other coupling device, so that the differential state of the power distributing mechanism 16, 216 is controllable by controlling the second electric motor M2 rather than the first electric motor M1.

What is claimed is:

1. A control apparatus for a power transmitting system of a hybrid vehicle, said control apparatus comprising:
   a differential portion which has a differential mechanism operatively connected to an engine and a first electric motor operatively connected to the differential mechanism, and a differential state of which is controlled by controlling an operating state of the first electric motor;
   a differential-state switching device which is incorporated in the differential mechanism and which is operable according to a differential-state switching condition, to switch the differential mechanism between a differential state in which the differential mechanism is operable to perform a differential function and a non-differential state in which the differential mechanism is not operable to perform the differential function; and
   a differential-state-switching-condition changing portion that changes said differential-state switching condition when a temperature of the power transmitting system is lower than a predetermined threshold value.

2. The control apparatus according to claim 1, wherein said predetermined threshold value of the temperature of the power transmitting system is a value above which it is not necessary to change said differential-state switching condition for improving fuel economy of the hybrid vehicle.

3. The control apparatus according to claim 1, wherein said differential-state-switching-condition changing portion changes said differential-state switching condition to expedite a rise of at least one of the temperature of the power transmitting system and a temperature of said first electric motor, when the temperature of the power transmitting system is lower than said predetermined threshold value.

4. The control apparatus according to claim 1, wherein when the temperature of the power transmitting system is not lower than said predetermined threshold value, said differential-state-switching-condition changing portion maintains the differential-state switching condition that is determined so as to place said differential mechanism in one of the differential and non-differential states in which fuel economy of the hybrid vehicle is higher while the power transmitting system is placed in a fully warmed-up state.

5. The control apparatus according to claim 1, wherein said differential-state-switching-condition changing portion changes the differential-state switching condition so as to enlarge a differential region for placing said differential mechanism in said differential state, with a decrease of the temperature of the power transmitting system.

6. The control apparatus according to claim 1, further comprising a fluid temperature determining portion configured to determine, as the temperature of the power transmitting system, a temperature of a fluid used to cool or lubricate said differential mechanism and said first electric motor.

7. The control apparatus according to claim 1, wherein said differential portion is operable as a continuously-variable transmission by controlling the operating state of said first electric motor.

8. The control apparatus according to claim 1, wherein the power transmitting system further includes a second electric motor connected to a power transmitting path between said differential portion and a drive wheel of the hybrid vehicle, and said differential-state-switching-condition changing portion does not change said differential-state switching condition irrespective of the temperature of the power transmitting system, when a temperature of said first or second electric motor is not lower than a predetermined threshold value.

9. The control apparatus according to claim 8, wherein said predetermined threshold value of the temperature of the first or second electric motor is a value above which it is desirable to restrict or prevent a warm-up operation of the power transmitting system by operation of the first or second electric motor.

* * * * *